(12) United States Patent
Cheng et al.

(10) Patent No.: US 11,982,615 B2
(45) Date of Patent: May 14, 2024

(54) NANOSECOND-SCALE PHOTOTHERMAL DYNAMIC IMAGING

(71) Applicant: Trustees of Boston University, Boston, MA (US)

(72) Inventors: Ji-Xin Cheng, Newton, MA (US); Lu Lan, Allston, MA (US); Jiaze Yin, Waltham, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/127,388

(22) Filed: Mar. 28, 2023

(65) Prior Publication Data

US 2023/0243739 A1 Aug. 3, 2023

Related U.S. Application Data

(63) Continuation of application No. 17/881,996, filed on Aug. 5, 2022.

(60) Provisional application No. 63/229,841, filed on Aug. 5, 2021.

(51) Int. Cl.
  *G01N 21/17* (2006.01)
  *G01N 21/35* (2014.01)
  *G01N 21/47* (2006.01)

(52) U.S. Cl.
  CPC ........... *G01N 21/171* (2013.01); *G01N 21/35* (2013.01); *G01N 21/47* (2013.01); *G01N 2021/3595* (2013.01)

(58) Field of Classification Search
  CPC ....... G01N 21/171; G01N 21/35; G01N 21/47
  See application file for complete search history.

(56) References Cited

U.S. PATENT DOCUMENTS

| | | | |
|---|---|---|---|
| 5,982,482 A * | 11/1999 | Nelson | G01N 29/2418 356/237.1 |
| 9,131,170 B2 | 9/2015 | Mandelis et al. | |
| 9,180,650 B2 | 11/2015 | Mandelis et al. | |
| 9,584,771 B2 | 2/2017 | Mandelis et al. | |
| 2002/0126732 A1* | 9/2002 | Shakouri | G01J 5/58 374/130 |
| 2006/0181708 A1 | 8/2006 | Takahashi et al. | |
| 2018/0246032 A1 | 8/2018 | Li et al. | |
| 2018/0270474 A1* | 9/2018 | Liu | A61B 6/508 |
| 2019/0120753 A1* | 4/2019 | Prater | H01J 37/26 |

(Continued)

OTHER PUBLICATIONS

Zhang, Y. et al., "Vibrational Spectroscopic Detection of a Single Virus by Mid-Infrared Photothermal Microscopy," Analytical Chemistry 93, pp. 4100-4107 (2021).

(Continued)

*Primary Examiner* — Hugh Maupin
(74) *Attorney, Agent, or Firm* — Burns & Levinson LLP; Steven M. Mills

(57) ABSTRACT

Systems and methods are provided for performing photothermal dynamic imaging. An exemplary method includes: scanning a sample to produce a plurality of raw photothermal dynamic signals; receiving the raw photothermal dynamic signals of the sample; generating a plurality of second signals by matched filtering the raw photothermal dynamic signals to reject non-modulated noise; and performing an inverse operation on the second signals to retrieve at least one thermodynamic signal in a temporal domain.

22 Claims, 17 Drawing Sheets

(56) References Cited

U.S. PATENT DOCUMENTS

| | | | |
|---|---|---|---|
| 2021/0164894 A1* | 6/2021 | Prater | G01N 21/35 |
| 2021/0215601 A1* | 7/2021 | Prater | C12M 41/36 |
| 2021/0389234 A1 | 12/2021 | Mandelis et al. | |
| 2023/0063843 A1* | 3/2023 | Prater | G01J 3/447 |

OTHER PUBLICATIONS

Zharov, V. P. & Lapotko, D. O., "Photothermal imaging of nanoparticles and cells," IEEE Journal of Selected Topics in Quantum Electronics 11, pp. 733-751 (2005).

Zharov, V. P., "Ultrasharp nonlinear photothermal and photoacoustic resonances and holes beyond the spectral limit," Nature Photonics vol. 5, pp. 110-116 (2011).

International Search Report of International Patent Application No. PCT/US2022/074606 dated Oct. 28, 2022.

Adhikari, S. et al., "Photothermal microscopy: imaging the optical absorption of single nanoparticles and single molecules," ACS Nano 14, pp. 16414-16445 (2020).

Aleshire, K. et al., "Far-field midinfrared superresolution imaging and spectroscopy of single high aspect ratio gold nanowires," Proceedings of the National Academy of Sciences 117, pp. 2288-2293 (2020).

Ali et al., "A review of the properties and applications of poly (methyl methacrylate)(PMMA)," Polymer Reviews 55, pp. 678-705 (2015).

Bai, Y. et al., "Bond-selective imaging of cells by midinfrared photothermal microscopy in high wavenumber region," The Journal of Physical Chemistry B 121, pp. 10249-10255 (2017).

Bai, Y. et al., "Ultrafast chemical imaging by widefield photothermal sensing of infrared absorption," Science Advances 5, eaav7127 (2019).

Berciaud et al., "Observation of intrinsic size effects inthe optical response of individual gold nanoparticles," Nano Letters 5, pp. 515-518 (2005).

Berciaud et al., "Photothermal heterodyne imaging of individual nonfluorescent nanoclusters and nanocrystals," Physical Review Letters 93, 257402, 4 pps. (2004).

Bergman et al., Chapter 5, "Transient Conduction," in Fundamentals of Heat and Mass Transfer, 19 pps., (John Wiley & Sons, 2011).

Burgi, D. S. & Dovichi, N. J., "Submicrometer resolution images of absorbance and thermal diffusivity with the photothermal microscope, " Applied Optics 26, pp. 4665-4669 (1987).

Chae, J. et al., "Nanophotonic atomic force microscope transducers enable chemical composition and thermal conductivity measurements at the nanoscale," Nano Letters 17, pp. 5587-5594 (2017).

Chatterjee et al., "Subdiffraction infrared imaging of mixed cation perovskites: Probing local cation heterogeneities," ACS Energy Letters 3, pp. 469-475 (2018).

Christofferson, J. et al., "Microscale and nanoscale thermal characterization techniques," Journal of Electronic Packaging 130, 7 pgs. (2008).

Dada et al., "Thermal diffusivity imaging with the thermal lens microscope," Applied Optics 50, pp. 6336-6342 (2011).

Gaiduk et al., "Room-temperature detection of a single molecule's absorption by photothermal contrast," Science 330, pp. 353-356 (2010).

He, J. et al., "Label-free imaging of melanoma with nonlinear photothermal microscopy," Optics Letters vol. 40, pp. 1141-1144 (2015).

Jiang, Y. et al., "Optoacoustic brain stimulation at submillimeter spatial precision," Nature Communications vol. 11, pp. 1-9 (2020).

Katzenmeyer, A. M. et al., "Mid-infrared spectroscopy beyond the diffraction limit via direct measurement of the photothermal effect," Nanoscale 7, pp. 17637-17641 (2015).

Klementieva, O. et al., "Super-Resolution Infrared Imaging of Polymorphic Amyloid Aggregates Directly in Neurons," Advanced Science 7, 1903004 (2020).

Lad et al., "The adsorbed conformation of globular proteins at the air/water interface," Physical Chemistry Chemical Physics 8, pp. 2179-2186 (2006).

Li, X. et al., "Fingerprinting a living cell by Raman integrated mid-infrared photothermal microscopy," Analytical Chemistry 91, pp. 10750-10756 (2019).

Li, Z. et al., "Super-resolution far-field infrared imaging by photothermal heterodyne imaging," The Journal of Physical Chemistry B, vol. 121, pp. 8838-8846 (2017).

Lim, J. M. et al., "Cytoplasmic protein imaging with mid-infrared photothermal microscopy: cellular dynamics of live neurons and oligodendrocytes," The Journal of Physical Chemistry Letters 10, pp. 2857-2861 (2019).

Lima et al., "Imaging Isotopically Labeled Bacteria at the Single-Cell Level Using High-Resolution Optical Infrared Photothermal Spectroscopy," Analytical Chemistry 93, pp. 3082-3088 (2021).

Ling, T. et al., "High-speed interferometric imaging reveals dynamics of neuronal deformation during the action potential," Proceedings of the National Academy of Sciences 117, pp. 10278-10285 (2020).

McLaren, R. & Dovichi, N. J., "Spatially resolved differential resistance of bulk superconductors by laser-induced heating," Journal of Applied Physics 68, pp. 4882-4884 (1990).

Muir et al., "Synchronous digitization for high dynamic range lock-in amplification in beam-scanning microscopy," Review of Scientific Instruments 85, 033703 (2014).

Nedosekin et al., "Super-resolution nonlinear photothermal microscopy," Small 10, pp. 135-142 (2014).

Pavlovetc, I. M. et al., "Infrared photothermal heterodyne imaging: Contrast mechanism and detection limits," Journal of Applied Physics 127, 165101 (2020).

Pavlovetc, I. M. et al., "Suppressing Cation Migration in Triple-Cation Lead Halide Perovskites," ACS Energy Letters 5, pp. 2802-2810 (2020).

Pleitez, M. A. et al., "Label-free metabolic imaging by mid-infrared optoacoustic microscopy in living cells," Nature Biotechnology 38, pp. 293-296 (2020).

Poudel et al., "Comparison and analysis of Acoustography with other NDE techniques for foreign object inclusion detection in graphite epoxy composites," Composites Part B: Engineering 78, pp. 86-94 (2015).

Rajakarunanayake, Y. & Wickramasinghe, H., "Nonlinear photothermal imaging," Applied Physics Letters vol. 48, pp. 218-220 (1986).

Rodionova, M. V. et al., "Biofuel production: challenges and opportunities," International Journal of Hydrogen Energy 42, pp. 8450-8461 (2017).

Samolis, P. D. et al., "Label-free imaging of fibroblast membrane interfaces and protein signatures with vibrational infrared photothermal and phase signals," Biomedical Optics Express 12, pp. 303-319 (2021).

Schnell, M. et al., "All-digital histopathology by infrared-optical hybrid microscopy," Proceedings of the National Academy of Sciences 117, pp. 3388-3396 (2020).

Selmke et al., "Photothermal single-particle microscopy: detection of a nanolens," ACS Nano 6, pp. 2741-2749 (2012).

Selmke, M. et al., "Photothermal single particle microscopy using a single laser beam," Applied Physics Letters 105, 013511 (2014).

Shi, J. et al., "High-resolution, high-contrast mid-infrared imaging of fresh biological samples with ultraviolet-localized photoacoustic microscopy," Nature Photonics 13, pp. 609-615 (2019).

Spadea et al., "Analysis of Fixed and Live Single Cells Using Optical Photothermal Infrared with Concomitant Raman Spectroscopy," Analytical Chemistry 93, pp. 3938-3950 (2021).

Sullenberger et al., "Spatially resolved individual particle spectroscopy using photothermal modulation of Mie scattering," Optics Letters 42, pp. 203-206 (2017).

Tamamitsu, M. et al., "Label-free biochemical quantitative phase imaging with mid-infrared photothermal effect," Optical 7, pp. 359-366 (2020).

Toivanen, J. et al., "3D thermal tomography with experimental measurement data," International Journal of Heat and Mass Transfer 78, pp. 1126-1134 (2014).

(56) References Cited

OTHER PUBLICATIONS

Vavilov, V. P. & Burleigh, D. D., "Review of pulsed thermal NDT: Physical principles, theory and data processing," NDT&E International 73, pp. 28-52 (2015).
Wang, Y. et al., "Raman-deuterium isotope probing to study metabolic activities of single bacterial cells in human intestinal microbiota," Microbial Biotechnology 13, pp. 572-583 (2020).
Wiegand et al., "Agar and broth dilution methods to determine the minimal inhibitory concentration (MIC) of antimicrobial substances," Nature Protocols, vol. 3, No. 2, pp. 163-175 (2008).
Xu, J. et al., "Fingerprinting Bacterial Metabolic Response to Erythromycin by Raman-Integrated Mid-Infrared Photothermal Microscopy," Analytical Chemistry 92, pp. 14459-14465 (2020).
Yin et al., "Nanosecond-Resolution Photothermal Dynamic Imaging via MHz Digitization and Match Filtering," Jun. 2021, Preprint (Version 1). <https://doi.org/10.21203/rs.3.rs-496490/v1>.
Zhang, D. et al., "Bond-selective transient phase imaging via sensing of the infrared photothermal effect," Light: Science & Applications 8, pp. 1-12 (2019).
Zhang, D. et al., "Depth-resolved mid-infrared photothermal imaging of living cells and organisms with submicrometer spatial resolution," Science Advances 2, e1600521 (2016).

* cited by examiner

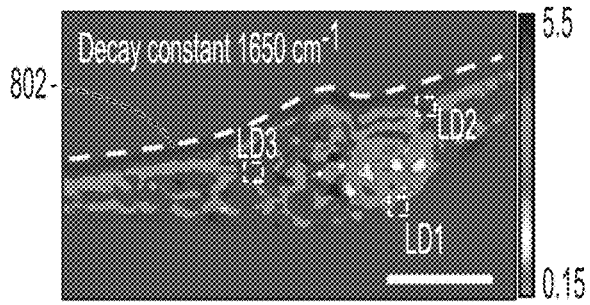
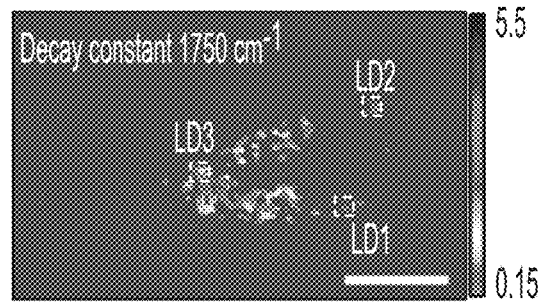
FIG. 8E          FIG. 8F
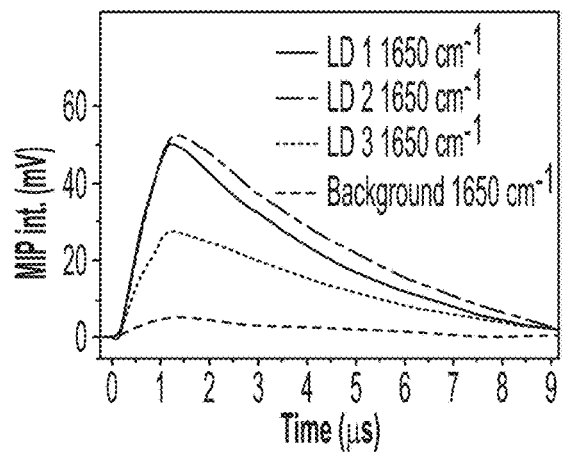
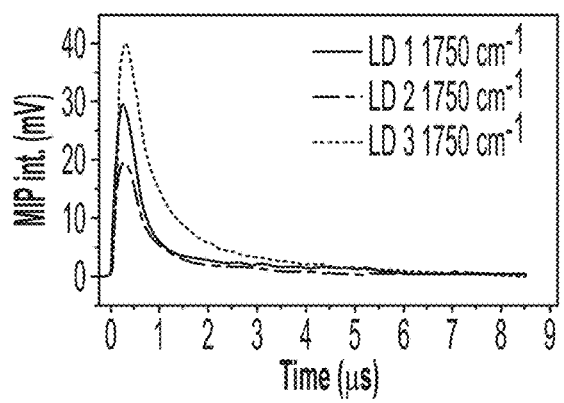
FIG. 8G          FIG. 8H
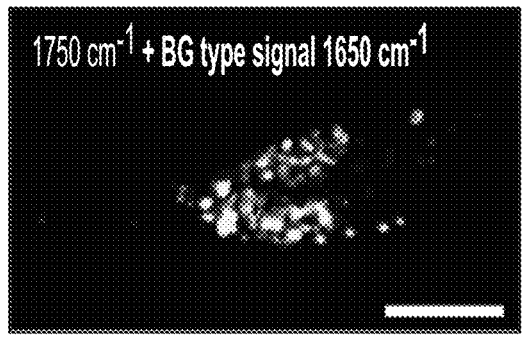
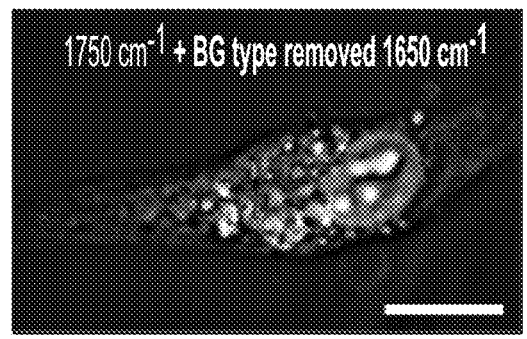
FIG. 8I          FIG. 8J

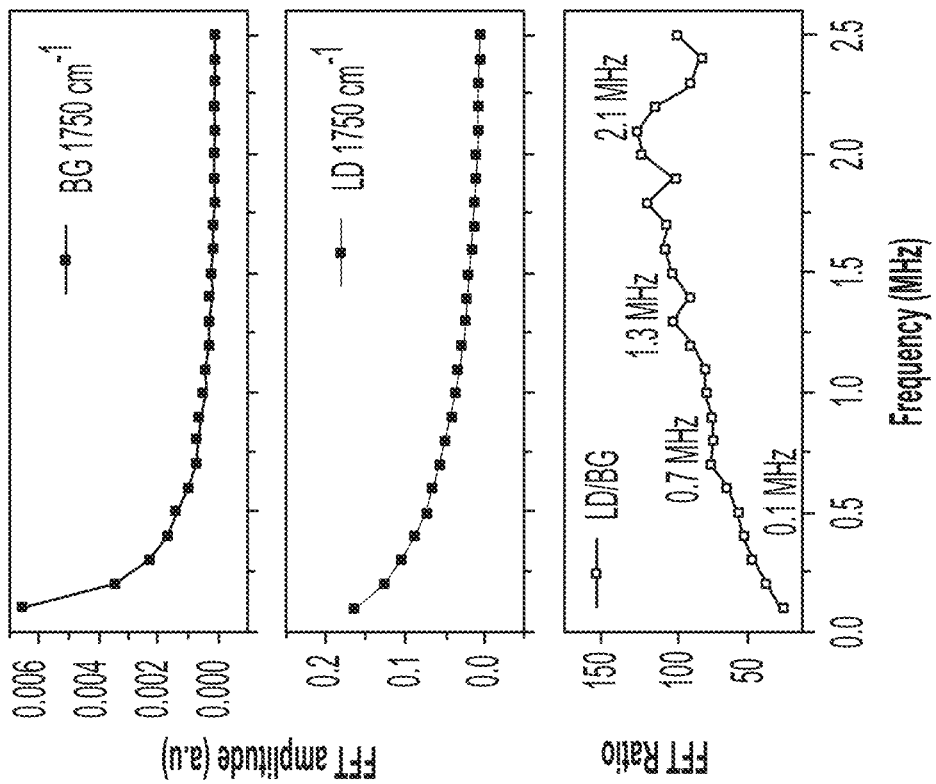
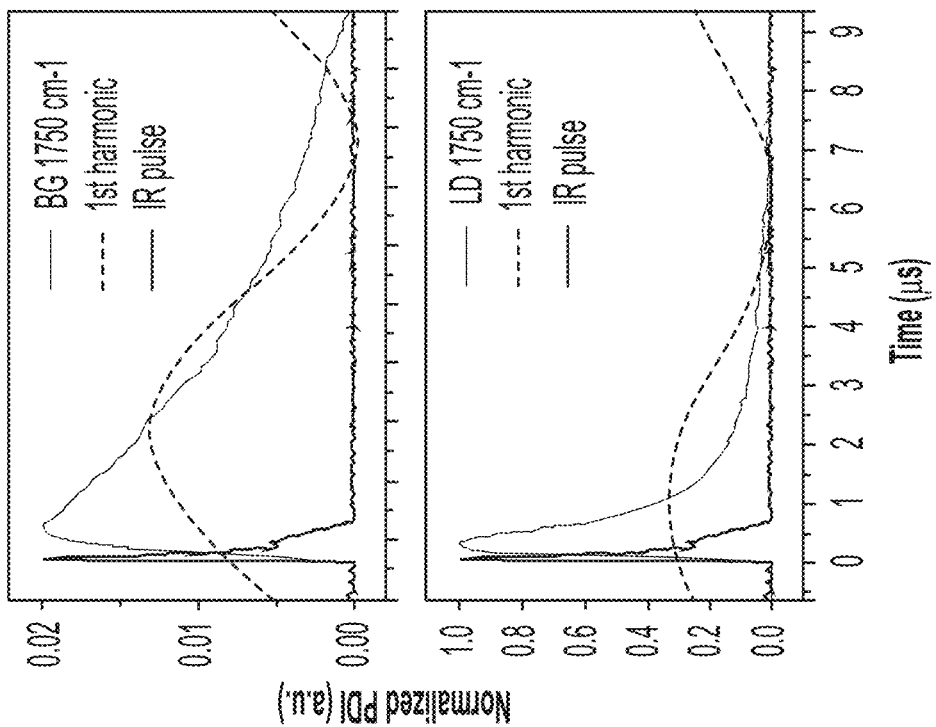
FIG. 9C
FIG. 9D

NANOSECOND-SCALE PHOTOTHERMAL DYNAMIC IMAGING

RELATED APPLICATIONS

This application is a continuation of U.S. application Ser. No. 17/881,996, filed on Aug. 5, 2022, which is related to and claims the benefit of U.S. Provisional Application No. 63/229,841, filed on Aug. 5, 2021, the entire contents of which are incorporated herein by reference.

GOVERNMENT SUPPORT

This invention was made with government support under grant number GM136223 awarded by the National Institutes of Health. The government has certain rights in the invention.

BACKGROUND

Photothermal microscopy is a versatile analytical tool to gauge optical absorption with extremely high sensitivity. Unlike conventional spectroscopic methods that measure light attenuation, photothermal detection acquires the absorption information via probing the thermal effect by another light beam outside the absorption band. Its high sensitivity majorly benefits from a reduced background by employing a modulated heating beam and heterodyne detection of a frequency-shifted probe beam with a lock-in amplifier. Shot-noise limited imaging of single gold nanoparticles of 1.4 nm diameter have been demonstrated using such detection schemes. Single-molecule detection limit has been reported as well.

Recently, an emerging label-free vibrational spectroscopic imaging modality uses a mid-infrared (mid-IR) laser as a pump source and visible light as a probe. In this imaging modality, the mid-IR absorption contrast arises from a transient thermal field confined in the absorber's vicinity. A submicron spatial resolution as good as 300 nm is achieved by probing such a field with tightly focused visible light. This new imaging modality enriches the photothermal techniques with enormous molecular fingerprint information and overcomes the limitations in conventional mid-IR absorption microscopy, and near-field IR approaches.

With the capability of submicron-chemical mapping of chemical bonds in aqueous environments, the mid-infrared photothermal imaging field has expanded with various innovations and applications. They include wide-field detection, optical phase detection, photoacoustic detection, synergistic integration with Raman, non-contact material characterization, bio-molecular mapping, and metabolism imaging of living cells and other organisms.

Despite the success in the development and applications of photothermal microscopy, valuable information about an object's thermodynamics and the transient photothermal process is rarely exploited. Photothermal heterodyne imaging (PHI) leveraging a lock-in approach can reveal a medium's thermal diffusivity. This approach has enabled various applications, including observing superconducting transition, tissue differentiation, and revealing membrane interface. However, lock-in demodulation typically loses all the photothermal signal's higher-order harmonics, offering poor temporal resolution.

Thus, it is hard to use PHI to interpret a mid-infrared photothermal signal that originates from the embedding medium and the object. In the temporal domain, a time-gated approach employing a short pulse probe can resolve the dynamics by tuning the delay between probe and pump pulses. Yet, to acquire a complete thermodynamic spectrum depicting temperature rise and decay at nanosecond resolution would require thousands of repetitive measurements, making it unsuitable for routine use.

SUMMARY

According to one aspect of the subject matter described in this disclosure, a method for performing photothermal dynamic imaging is provided. The method includes the following: scanning a sample to produce a plurality of raw photothermal dynamic signals; receiving the raw photothermal dynamic signals of the sample; generating a plurality of second signals by matched filtering the raw photothermal dynamic signals to reject non-modulated noise, the matched filtering performed by a comb-like passband in the frequency domain, wherein the comb-like passband includes at least one window with a center position colocalized at harmonic frequencies to reject non-modulated noise; and performing an inverse operation on the second signals to retrieve at least one thermodynamic signal in a temporal domain.

According to one implementation of the subject matter described in this disclosure, a method for performing photothermal dynamic imaging is provided. The method includes the following: scanning a sample to produce a plurality of raw photothermal dynamic signals; receiving the raw photothermal dynamic signals of the sample; generating a plurality of second signals by matched filtering the raw photothermal dynamic signals to reject non-modulated noise, the matched filtering performed by a comb-like passband in the frequency domain, wherein the comb-like passband includes at least one window with a center position colocalized at harmonic frequencies to reject non-modulated noise; performing an inverse operation on the second signals to retrieve a at least one thermodynamic signal in a temporal domain; determining, using the at least one thermodynamic signal, a water background of the sample; determining a thermal decay difference between the water background and the sample; and suppressing, using the thermal decay difference, the water background in photothermal imaging of the sample.

According to another aspect of the subject matter described in this disclosure, a system for performing photothermal dynamic imaging is provided. The system includes one or more computing device processors, and one or more computing device memories coupled to the one or more computing device processors. The one or more computing device memories storing instructions executed by the one or more computing device processors, wherein the instructions are configured to: scan a sample to produce a plurality of raw photothermal dynamic signals; receive the raw photothermal dynamic signals of the sample; generate a plurality of second signals by matched filtering the raw photothermal dynamic signals to reject non-modulated noise, the matched filtering performed by a comb-like passband in the frequency domain, wherein the comb-like passband includes at least one window with a center position colocalized at harmonic frequencies to reject non-modulated noise; and perform an inverse operation on the second signals to retrieve a at least one thermodynamic signal in a temporal domain.

According to another implementation of the subject matter described in this disclosure, a system for performing photothermal dynamic imaging is provided. The system includes one or more signal amplification devices for amplifying a plurality of raw photothermal dynamic signals. One or more signal acquisition devices are coupled to the one or more signal amplification devices. One or more computing device processors are coupled to the one or more signal acquisition devices. One or more computing device memories are coupled to the one or more computing device processors. The one or more computing device memories store instructions executed by the one or more computing device processors, wherein the instructions are configured to: scan a sample to produce the plurality of raw photothermal dynamic signals; receive the raw photothermal dynamic signals of the sample; generate a plurality of second signals by matched filtering the raw photothermal dynamic signals to reject non-modulated noise, the matched filtering performed by a comb-like passband in the frequency domain, wherein the comb-like passband includes at least one window with a center position colocalized at harmonic frequencies to reject non-modulated noise; and perform an inverse operation on the second signals to retrieve a at least one thermodynamic signal in a temporal domain.

According to another implementation of the subject matter described in this disclosure, a non-transitory computer-readable storage medium storing instructions which when executed by a computer cause the computer to perform a method for performing photothermal dynamic imaging is provided. The method includes the following: scanning a sample to produce a plurality of raw photothermal dynamic signals; receiving the raw photothermal dynamic signals of the sample; generating a plurality of second signals by matched filtering the raw photothermal dynamic signals to reject non-modulated noise, the matched filtering performed by a comb-like passband in the frequency domain, wherein the comb-like passband includes at least one window with a center position colocalized at harmonic frequencies to reject non-modulated noise; and performing an inverse operation on the second signals to retrieve at least one thermodynamic signal in a temporal domain.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 8E is a decay constant map at 1650 $cm^{-1}$ of the locations indicated in FIGS. 8A-8B by exponential fitting, in accordance with some embodiments.

FIG. 8F is a decay constant map at 1750 $cm^{-1}$ of the locations indicated in FIGS. 8A-8B by exponential fitting, in accordance with some embodiments.

FIG. 8G are graphs of the thermodynamics of the lipid droplets indicated in FIG. 8E at 1650 $cm^{-1}$, in accordance with some embodiments.

FIG. 8H are graphs of the thermodynamics of the lipid droplets indicated in FIG. 8F at 1750 $cm^{-1}$, in accordance with some embodiments.

FIG. 8I is a merged photothermal intensity image at 1750 $cm^{-1}$ with the background thermodynamics at 1650 $cm^{-1}$, in accordance with some embodiments.

FIG. 8J is a merged photothermal intensity image of lipid contents at 1750 $cm^{-1}$ with protein content at 1650 $cm^{-1}$, in accordance with some embodiments.

FIG. 9C is a 21st harmonic amplitude image of the U87 cancer cells at the same field of view as in FIG. 9A, in accordance with some embodiments.

FIG. 9D are graphs of the normalized thermodynamics of the background and lipid droplets at positions indicated in FIG. 9A, in accordance with some embodiments.

DETAILED DESCRIPTION

Figures 1A, 1B, 1C:
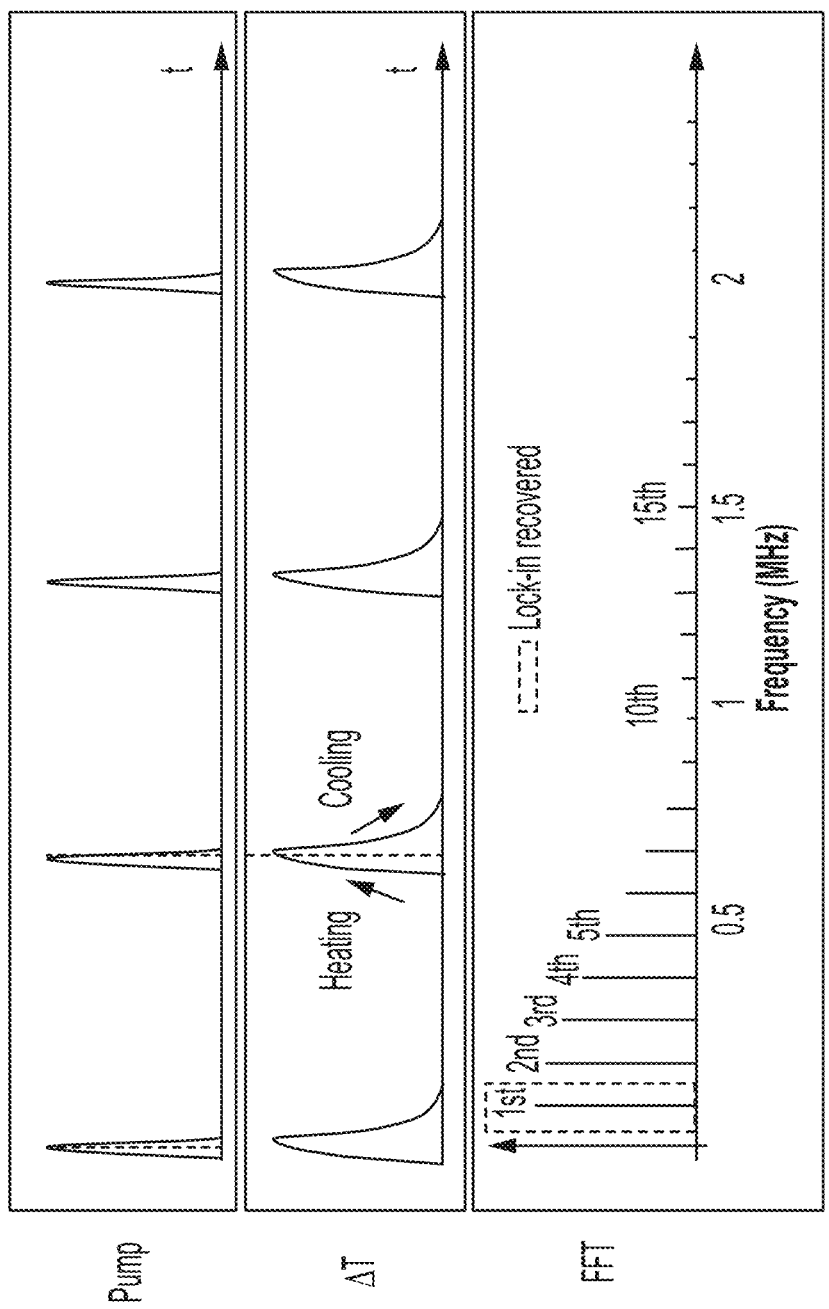
FIGS. 1A-1C are graphs of photothermal modulation under a pulsed pump source, in accordance with some embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

Described herein are example implementations of a mid-IR photothermal dynamic imaging (PDI) system with nanosecond-scale temporal resolution and covering a bandwidth larger than 25 MHz. The bandwidth may be between 1 kHz and 1 GHz. Using a wideband voltage amplifier and a megahertz digitizer, a thermodynamic spectrum in response to a single IR pulse excitation is acquired and combined with digital signal processing to filter out the noise outside the fundamental IR modulation frequency and harmonics. The PDI system may achieve more than a five-fold improvement in signal-to-noise ratio (SNR) than lock-in based photothermal heterodyne imaging (PHI). Moreover, the PDI system retrieves the transient thermal field properties and provides information on a target's physical properties and microenvironment.

The photothermal dynamics of various organelles inside a cancer cell may be obtained using this approach. Unlike the macroscopic observation of the homogeneous thermal response of tissues or cells, a highly heterogeneous chemically dependent thermal environment inside a cell may be depicted. By harnessing the thermal decay difference between water and biomolecules, cellular components that are difficult to be separated from a water background in conventional photothermal microscopy can now be differentiated based on their time-resolved signatures.

Collectively, the PDI system enables direct detection of a transient photothermal process with nanoseconds temporal resolution. Together with the mid-IR excitation, this approach allows for nondestructive investigation of the samples' intrinsic chemical and physical properties and enables chemical-specific transient thermal imaging applications.

The photothermal phenomenon originates from transforming absorbed photon energy into heat through nonradiative relaxation. Under pulsed laser excitation, shorter than thermal relaxation time absorbed energy deposits at the absorber and forms a localized thermal field. It induces concurrent thermoelastic deformation that modifies the local optical refractive index through local density change, which can be detected as time resolved photothermal signal through optical scattering. Compared with PHI detection of nanoparticles, there are two differences in interpreting the mid-infrared photothermal (MIP) thermodynamics.

Firstly, MIP absorbers cannot be modeled by point heat sources in a medium, specifically in a living system. For example, the bond-selective target like lipid droplets, protein aggregation, and cytoplasm are bulky. The thermodynamics are affected by both the absorbers and local medium collectively. Secondly, given the water absorption in the mid-IR range, both the absorbers and medium can experience temperature elevation in an aqueous environment that affects the signal contrast. Therefore, the thermal field evolvement within heterogeneous thermal diffusivity should be considered.

The absorber's local temperature evolvement under the mid-IR pump is composed of a temperature jump with the presence of a mid-IR pulse, as shown in FIG. 1A, followed by an exponential decay related to the heat dissipation, as shown in FIG. 1B. This transient process is given by solving the following heat transfer equation:

$$mC_s \frac{dT}{dt} = Q_{abs} - Q_{diss} \quad (1)$$

where m and $C_s$ represent the mass and specific heat capacity of the absorber; dT/dt is the temperature change over time; ($Q_{abs}-Q_{diss}$) denotes the energy flux, representing the rate difference between the absorbed and dissipated energies. The IR pulse duration (pulse width) may be between 1 ns to 1000 ns with a period between 1 μs to 100 μs.

The quantity $Q_{abs}$ can be approximated by $I_{IR}(t)\sigma_{abs}$, where $I_{IR}(t)$ represents the incident IR intensity over the IR pulse; $\sigma_{abs}$ represents the IR absorption cross section. The heat dissipation follows Newtown's law, $Q_{diss}$ is driven by the temperature gradient and given by $(hS[T(t)-T_0])$, where h and S represent the heat transfer coefficient and effective transfer surface area from specimen to environment, respectively. The relationship $(hS[T(t)-T_0])$ is the time-dependent temperature difference between the absorber and the ambient environment $T_0$.

During the heating process, $T(t)$ can be derived by solving Eq. (1) with the initial condition $T(0)=T_0$ and neglect the IR pulse shape:

$$T(t) = T_0 + \frac{I_{IR}\sigma_{abs}}{hS}\left(1 - e^{-\frac{hS}{mC_s}t}\right) \quad (2)$$

When the IR pulse heating is finished, $Q_{abs}$ becomes zero. The temperature changing is only driven by $Q_{diss}$, $T(t)$ is then solved as:

$$T(t) = T_0 + (T_{max} - T_0)e^{-\frac{hS}{mC_s}t} \quad (3)$$

where Tmax is the maximal temperature of absorber after heating finishes.

From this model, one may find that both heating and cooling processes can be described as exponential processes with a time constant $\tau$ of $mC_s/hS$. During the heating process, only with laser pulse duration is much shorter than $\tau$, the heat confinement condition is met assuming heat diffusion is negligible, and Eq. (2) becomes to $(T_0+(I_{IR}\sigma_{abs}/hS)t)$. Otherwise, the temperature can slowly reach a plateau when absorbers approximate their thermal equilibrium state.

As an analogy to a resistor-capacitor circuit, the quantity $mC_s$ is the thermal capacitor, and $1/hS$ is the thermal resistor. Either increment of them would result in a considerable time constant. Their time constants are expected to be significant for absorbers with large heat capacities, such as bulky water and large particles. The quantity hS is most related to the embedding medium's heat transfer capability and the absorber's shape. Therefore, the thermal response is tightly connected to the physical properties of both sample and coupled environment, which could be vastly different in a heterogeneous system like living cells.

In the frequency domain, the thermal response induced by a short pulse laser would span over a broad band, which is the result of multiplexing the pulse frequency spectra with a transfer function of the absorber. The transfer function of a particular absorber with time constant i can be approximated by:

$$T(f) = \frac{1}{1 + (2\pi f/\tau)^2} \quad (4)$$

This representation conveys important facts about a photothermal signal. Firstly, the absorber is a low pass filter for transient thermal perturbation, with a −3 dB cutoff frequency at $\frac{1}{2\pi\tau}$. This relationship addresses choosing the proper IR repetition rate for avoiding heat residual and maintaining considerable modulation depth. Secondly, the photothermal signal produced by IR with a repetition rate of fIR can be treated as a Fourier synthesis of such function and contains components at each harmonic of fIR as shown in the simulation of polymethyl methacrylate (PMMA) beads in air having diameters D=500 nm PMMA bead in FIG. 1C.

In particular, FIG. 1C shows harmonics are spread widely in the frequency domain, with bandwidth determined by cutoff frequency. Large $\tau$ results in a narrow span. The photothermal signal becomes more like the sinusoidal wave at modulation frequency and has few higher-order harmonics, while fast decay signals have many strong harmonics components. Moreover, these features highlight the microenvironment influences on conventional lock-in based MIP systems. The lock-in method only recovers the fundamental harmonic amplitude and misses all other signals at harmonic frequencies, which sacrifices the sensitivity and causes contrast distortion in a heterogeneous sample with different thermal responses. In addition, the water background maximizes at modulation frequency and hides the small organelles' signal with a weak signal magnitude but loads various high-order harmonic components in the frequency domain.

The photothermal signals are subtle and modulated over large background signals. The lock-in detection approach demodulates the signals by rejecting noise outside the modulation frequency band. However, this narrow band filtering technique loses the detection bandwidth and temporal resolution. The PDI system utilizes a broadband acquisition scheme using match filtering to suppress the noise. This way, bandwidth, temporal resolution, and sensitivity are well maintained.

Figure 2A:
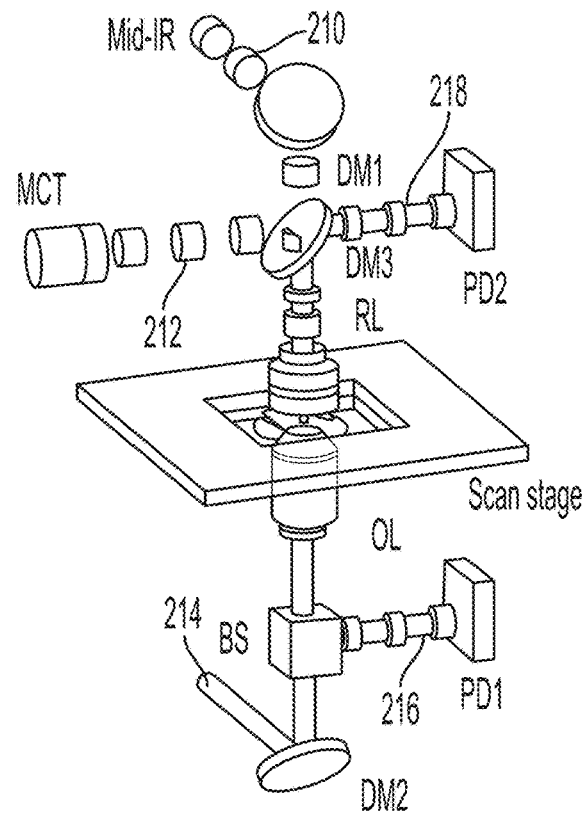
FIGS. 2A-2B are schematic diagrams of the photothermal dynamic imaging (PDI) system, in accordance with some embodiments.

FIG. 2A is a schematic diagram of an example mid-IR PDI system, used in accordance with some embodiments. A quantum cascade laser provides a pulsed mid-IR pump beam 210 that passes through a first dichroic mirror (DM1) and then is focused on a sample with a reflective objective (RL). The residual mid-IR beam 212 reflected by dichroic mirror DM is monitored with an MCT detector. A counter propagated probe beam 214 from a continuous-wave 532 nm laser passes through a second dichroic mirror (DM2) and is focused on a water immersion objective lens (OL). Backscattered probe photons 216 are collected with a 50/50 beam splitter (BS), and forward scattered probe photons 218 are collected by the reflective objective lens (RL) and separated by a dichroic mirror (DM3). Both forward 218 and backward 216 probe photons are collected and sent to silicon photodiodes PD1 and PD2 connected to a wideband voltage amplifier 202, as shown in FIG. 2B.

Figure 2B:
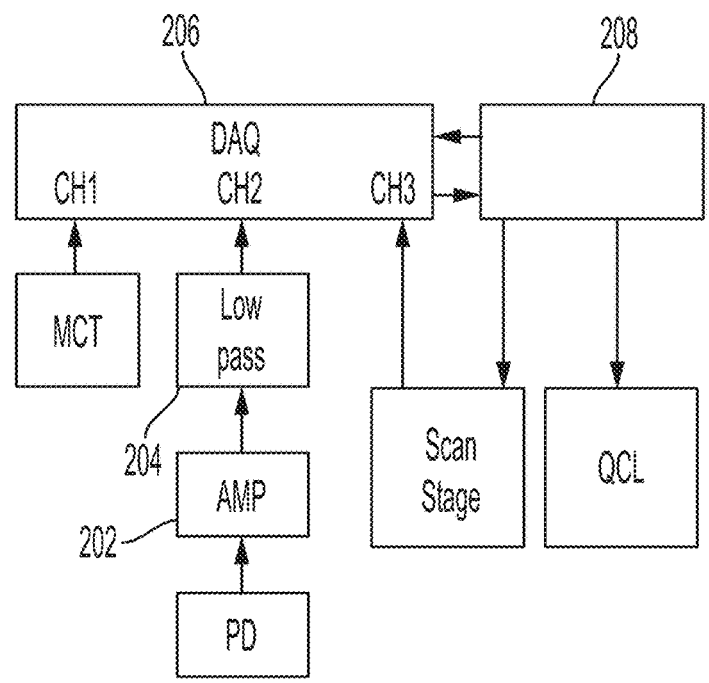

FIG. 2B shows the voltage signal filtered with a low pass filter 204 with a cut-off frequency of 25 MHz and sent to a highspeed digitizer (DAQ) 206 with a sampling rate of 50 million samples per second. DAQ 206 has a sampling rate between 1 million samples per second and 3 billion samples per second. A computer 208 is used to control the scan stage 209 and the QCL laser synchronously. Meanwhile, a mercury cadmium telluride (MCT) detector is placed to monitor the IR pump pulse, and the signal is digitized by the same DAQ 206 synchronously.

The acquired raw PDI data per frame is transferred from DAQ 206 to the memory of computer 208 after sample scanning is finished and processed with custom-coded software. The whole temporal trace is segmented according to an assigned pixel dwell time. Then each segment is filtered in the frequency domain with a comb-like passband with each passing window at the harmonic pump laser repetition rate (For laser running at 100 kHz, the pass windows are chosen at 100 kHz, 200 kHz, . . . , 2 MHz, 2.1 MHz). The spectrum resolution defines the window size according to pixel dwell time. The number of passing harmonics decides the thermal dynamic bandwidth and influences the SNR. In this case, one may use 16 order harmonics (1.6 MHz) to depict absorption contrast, giving the highest image SNR. On the other hand, for defining a complete photothermal dynamic profile, one may use the bandwidth of 25 MHz.

Figure 3A:
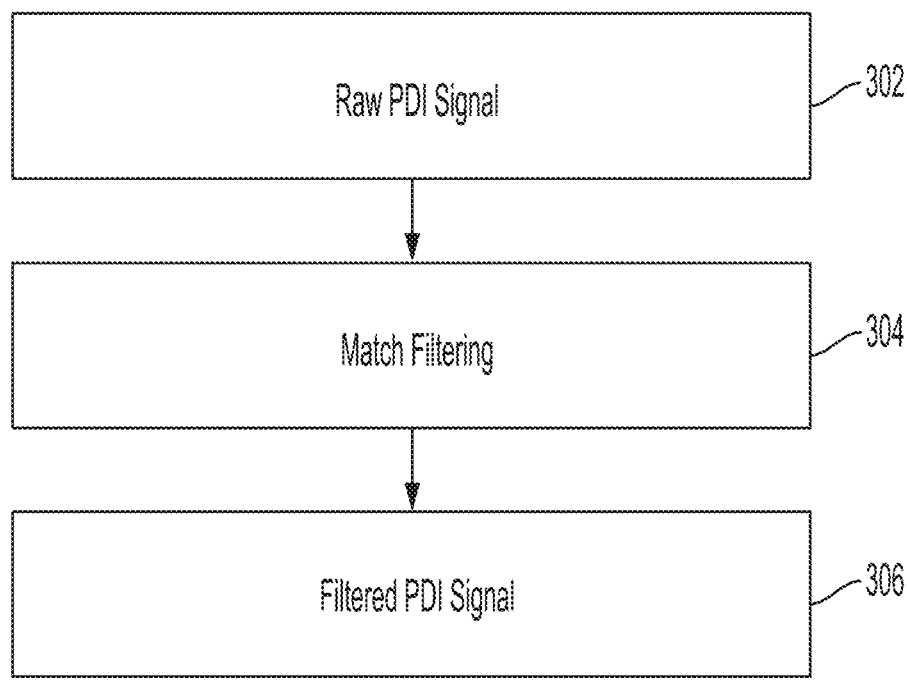
FIG. 3A is a flowgraph of the digital processing used by the photothermal imaging system, in accordance with some embodiments.
Figure 3B:
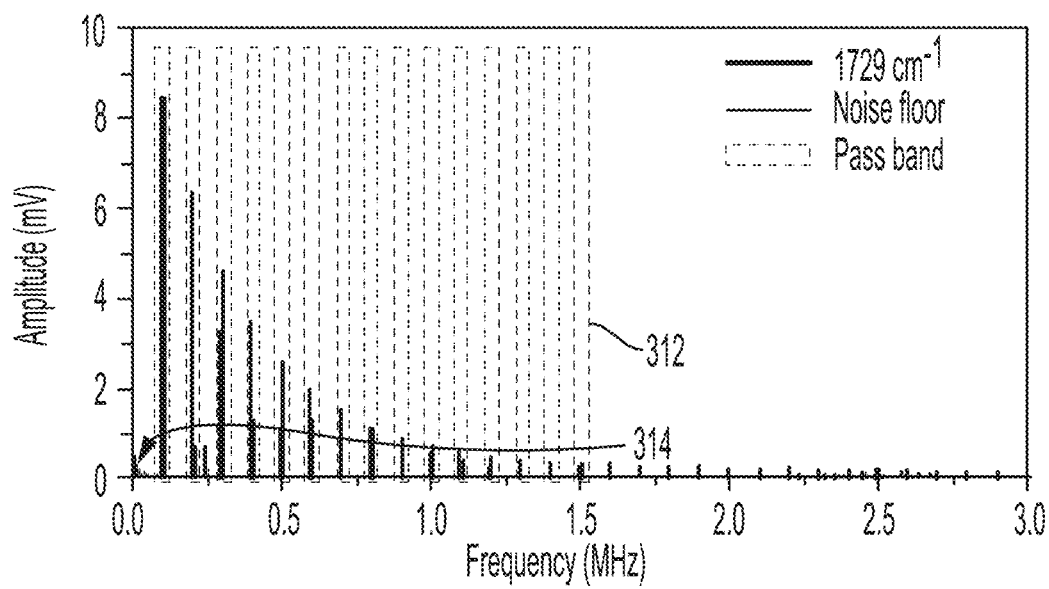
FIG. 3B is a schematic diagram of a comb-like passband used by the photothermal imaging system, in accordance with some embodiments.

FIG. 3A is a process flowgraph for performing PDI, in accordance with some embodiments. The PDI raw data was acquired from the center of 500 nm PMMA beads under the IR pump at its absorption peak of 1729 cm$^{-1}$ (Step 302). A single pulse photothermal signal can be clearly resolved with a signal-to-noise ratio (SNR) over 43 without averaging using the broadband detection scheme. This single pulse resolved capability pushes PDI to an unprecedented imaging speed with a minimum acquisition time of a few microseconds. Practically limited by the stage scanning speed, the signal acquired per pixel is a segment of hundreds of microseconds. Match filtering, using Fourier transform, is performed on each segment with a comb-like passband 310 in the frequency domain to enhance the SNR (Step 304). FIG. 3B shows the comb-like passband 310, where each window 312 has a center position colocalized at harmonic frequencies in the frequency domain to reject most of the non-modulated noise 314. After filtering, a filtered photothermal signal 308 is acquired using an inverse Fourier transform (Step 306). The filtered photothermal signal is related to an X-Y-t stack reconstructed with each spatial pixel extended in the temporal domain (Step 306).

Figure 4C:
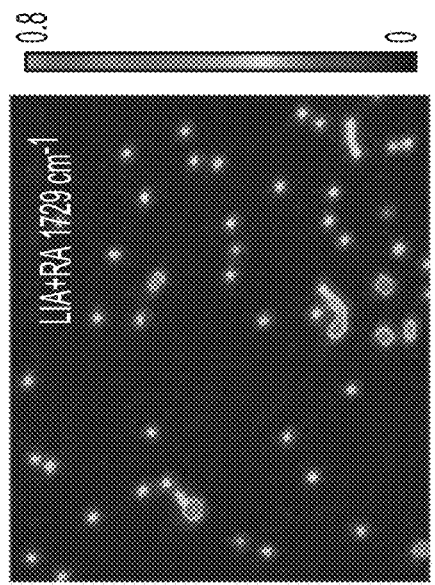
FIG. 4C is a photothermal intensity image us a lock-in (LIA) based method in the same field of view, in accordance with some embodiments.
Figure 4B:
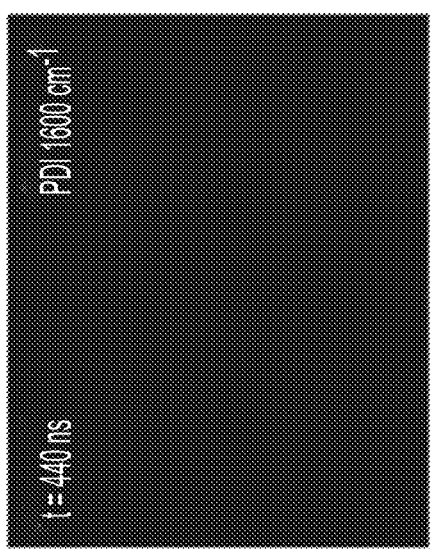
FIGS. 4A-4B are photothermal intensity images of 300 nm polymethyl methacrylate (PMMA) beads at absorption peak of 1729 $cm^{-1}$ and off resonant peak at 1600 $cm^{-1}$, in accordance with some embodiments.
Figure 4A:
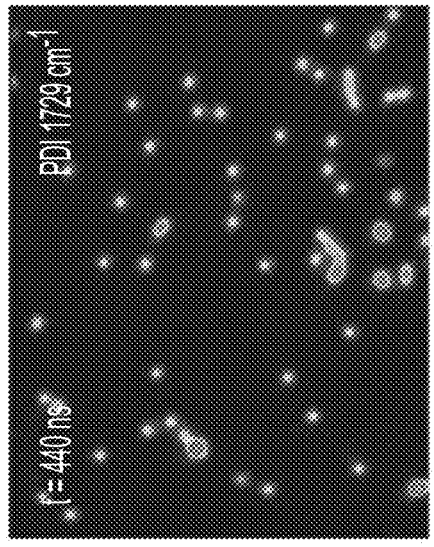

The PDI was performed on PMMA beads with a nominal diameter of 300 nm. After tuning the QCL laser to 1729 cm$^{-1}$, corresponding to the absorption peak of the C=O bonds in PMMA, a photothermal intensity image of the PMMA beads was acquired, as shown in FIG. 4A. FIG. 4A shows most of the PMMA beads reached their highest temperature at t=440 ns. FIG. 4B shows no photothermal contrast at the off-resonance mid-IR excitation of 1600 cm$^{-1}$. FIG. 4C shows the photothermal intensity image of a conventional MIP microscope at the excitation of 1729 cm$^{-1}$ having the same field of view as FIG. 4A using a lock-in and resonant amplifier. While the lock-in method produces an SNR of 71 with a pixel dwell time of 500 µs, indicating an improvement close to five-fold in detection sensitivity. The pixel dwell time is pushed to 200 µs, and one can achieve an SNR of 220 for a single PMMA bead using the PDI.

Figures 5A, 5B, 5C:
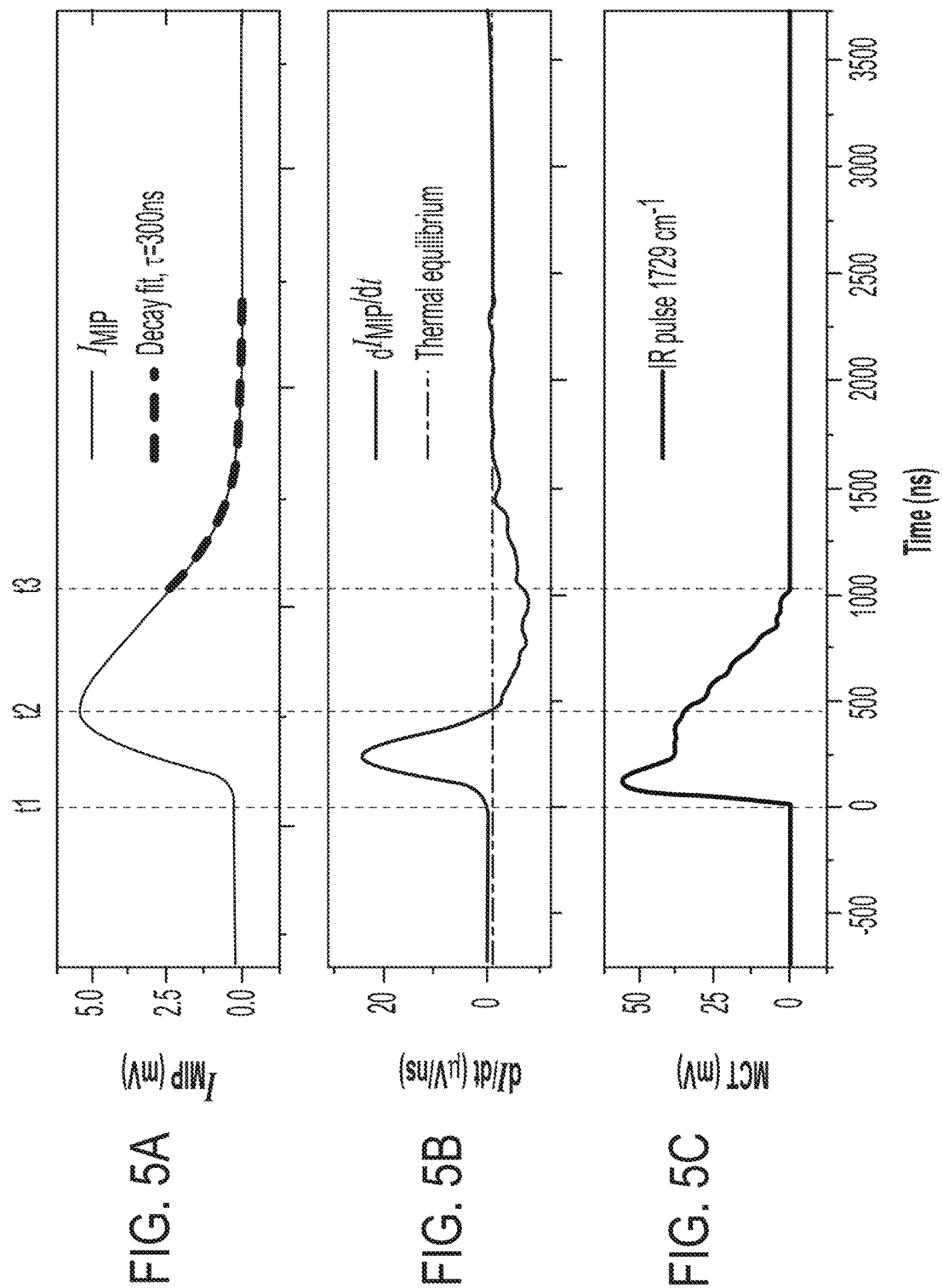
FIGS. 5A-5C are graphs of the photothermal dynamic of the 300 nm PMMA beads of FIGS. 4A-4B, in accordance with some embodiments.

FIG. 5A shows the photothermal dynamic profile of the PMMA beads shown in FIG. 4A. The highest temporal resolution in the current PDI system is ultimately limited by the photodiode response time, which is a few nanoseconds. But due to the digitizer 206, the sampling rate of 50M samples/second is used or 20 nanoseconds. With the acquired temporal profile, one can quantitatively measure the thermal decay constant of the dissipation process after t3 when the IR pulse is finished. By using an exponential fitting function, as shown by the dashed line 502, the fitted decay constant is 300 ns.

From Eq.3, this time constant is given by $mC_s/hS$. The heat transfer parameter hS between the absorber and its microenvironment may be determined using the information on the material's density $\rho$ and $C_s$. In the case of a 300 nm PMMA particle on a calcium fluoride (CaF$_2$) substrate, the heat transfer parameter is determined to be 7.78E-8 W/K. Using the finite element method (FEM), this parameter was determined to be 7.65E-8 W/K, which closely matches the experimental measurement.

The time-resolved energy flux function [Qabs(t)-Qdiss(t)] in Eq.1 could be directly evaluated by taking the derivative of the transient photothermal signal to time, as shown in FIG. 5B. From the model, this function is written as:

$$\frac{dI_{MIP}}{dt} = \frac{\gamma}{mC_s} I_{IR}(t)\sigma_{abs} - \frac{hS}{mC_s} I_{MIP}(t) \quad (5)$$

where $$\gamma = \frac{dI_{MIP}}{dt}$$

is the coefficient representing the scattering intensity change per kelvin for a particular sample.

This function matched well with the IR pulse shape in experimental results. The thermodynamics is composed of three stages. At the beginning of heating (from t1 to t2), the heat dissipation is negligible. The first term that relates to the energy absorption is dominant, resulting in a pulse-like waveform similar to the IR pulse shape $I_{IR}(t)$, as indicated in FIG. 5C. The temperature keeps rising until the heat dissipation term equals heat influx; at this point, the energy flux function becomes zero, and the absorber enters a thermal equilibrium state.

Due to the non-ideal IR pulse shape, the cooling process happened before the IR pulse was entirely finished. From t2 to t3, with the IR intensity reduced gradually, the dissipated energy becomes dominant, and the energy flux function starts to be negative, showing the absorber has entered the cooling stage. After the IR pulse ended (>t3), the heat flux function only shows the heat dissipation term as an exponential decay. This explained why the experimentally acquired thermodynamics of the 300 nm PMMA beads have a concave function-like decay at the beginning of cooling.

Figure 6:
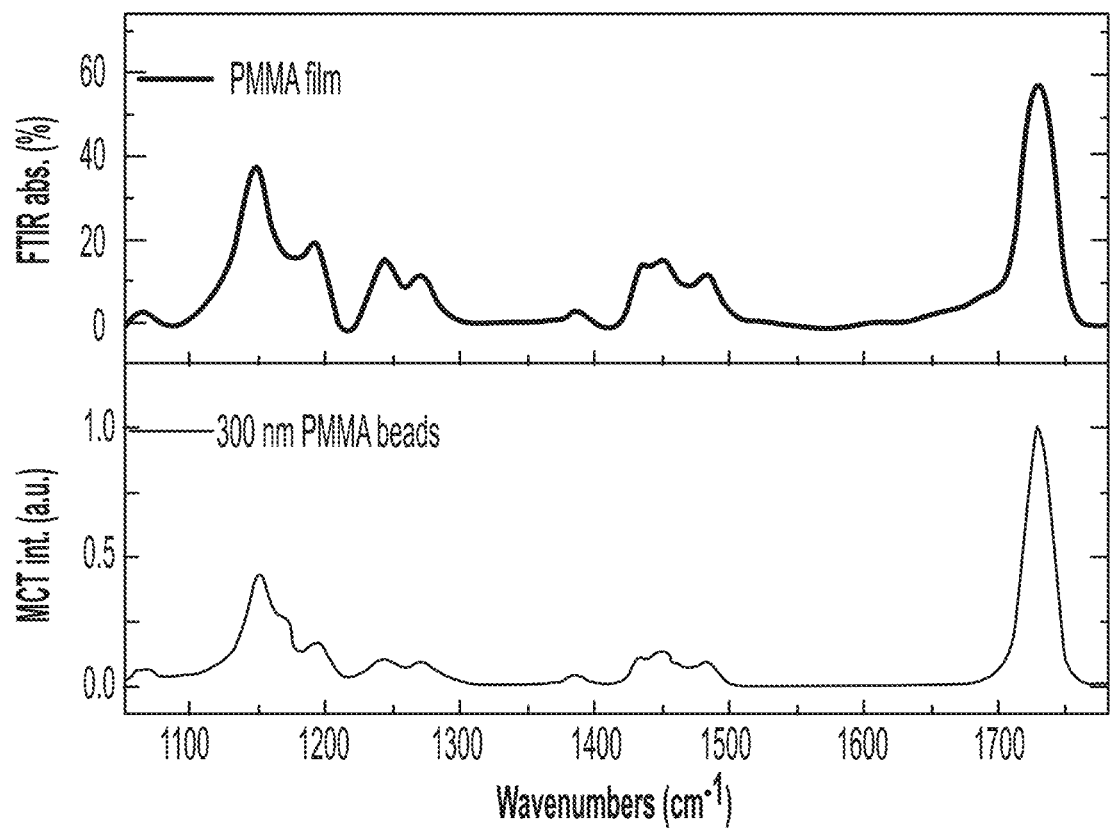
FIG. 6 is a graph illustrating the spectrum profile of PMMA, in accordance with some embodiments.

The photothermal intensity was taken under different IR wavelengths to validate the spectral fidelity. The MIP spectrum of the 300 nm PMMA beads was compared with the spectrum of a PMMA film acquired with FTIR, as shown in FIG. 6. The IR laser pulse energy normalized the raw photothermal spectra. Good consistency was observed in the entire region.

Figure 7A:
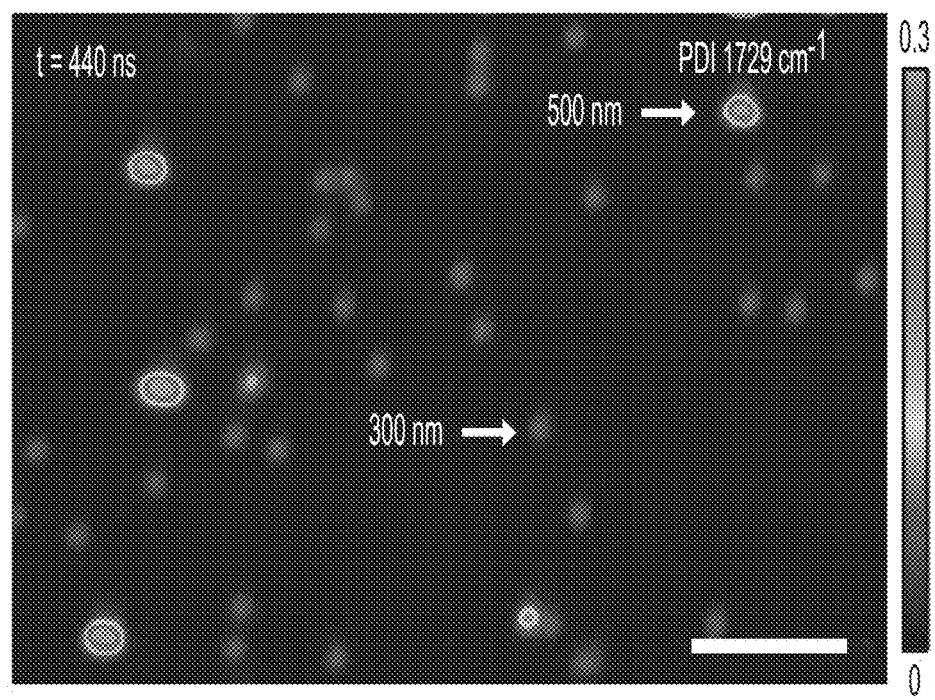
FIG. 7A is a photothermal intensity image of 300 nm and 500 nm PMMA beads mixture at absorption peak 1729 $cm^{-1}$, in accordance with some embodiments.
Figure 7B:
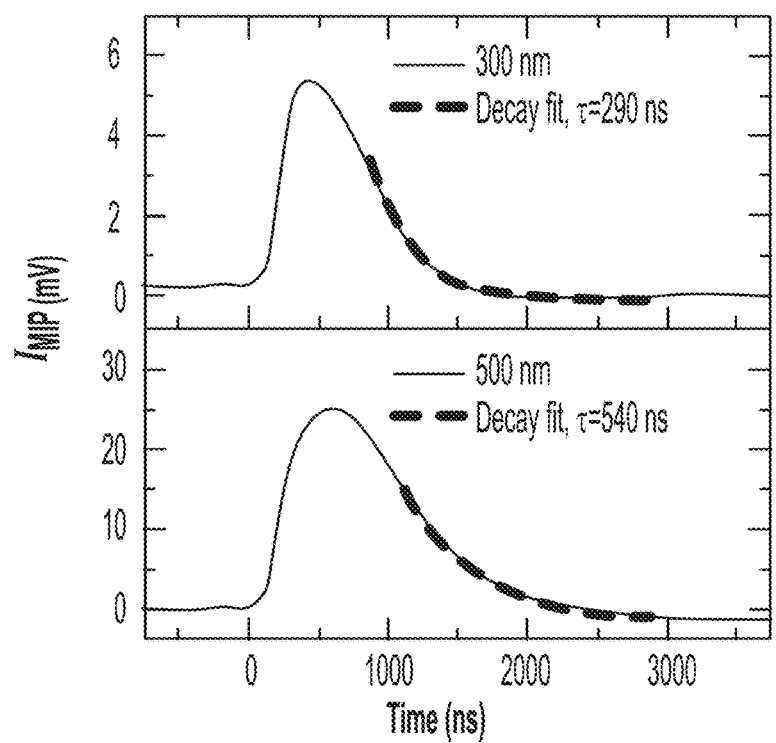
FIG. 7B are graphs of the photothermal dynamics of 300 nm and 500 nm PMMA beads, in accordance with some embodiments.
Figure 7C:
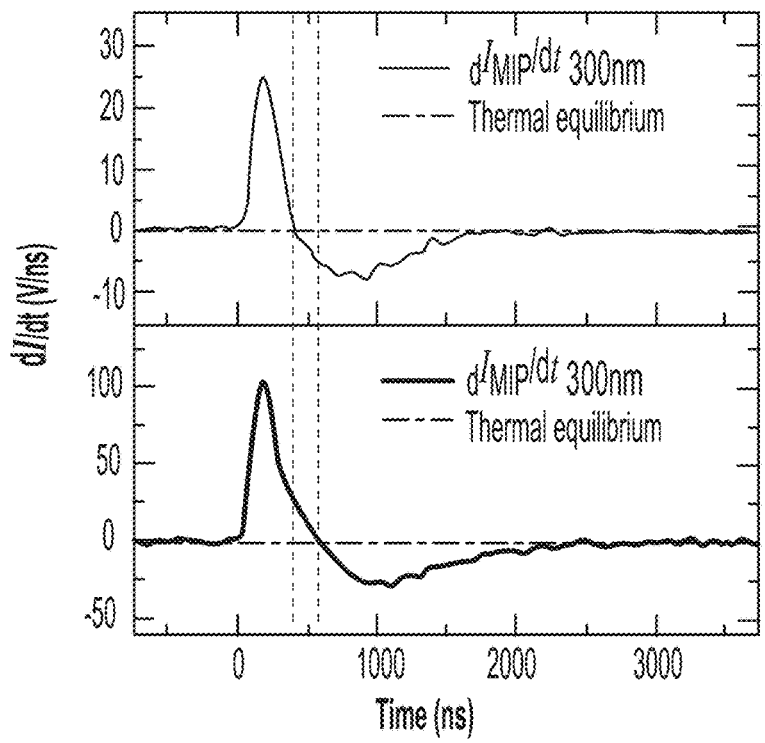
FIG. 7C are graphs of the time-resolved energy flux function acquired by derivative over time, in accordance with some embodiments.

The thermodynamic model discussed above shows that both the temperature rise and decay are strongly related to the time constant $mC_s/hS$. For spherical particles embedding in a uniform medium, the parameter hS can be approximated by $2\pi kD$, where k is the medium heat conductivity and D is the particle diameter. As a result, the decay constant is proportional to $r^2 \rho C_s/k$. For the particle with the same material and uniform microenvironment, the time constant has an $r^2$ dependency. Thermodynamic imaging of PMMA particles of different sizes (300 nm and 500 nm) was performed to validate this relationship, as shown in FIG. 7A. Except for the photothermal intensity difference, a significant difference in their thermodynamics is observed. The thermodynamics and heat flux function of the indicated particles in FIG. 7A is shown in FIG. 7B and FIG. 7C, respectively. The retrieved decay constant for the 300 nm and 500 nm particles are 290 ns and 540 ns, respectively.

Figure 7D:
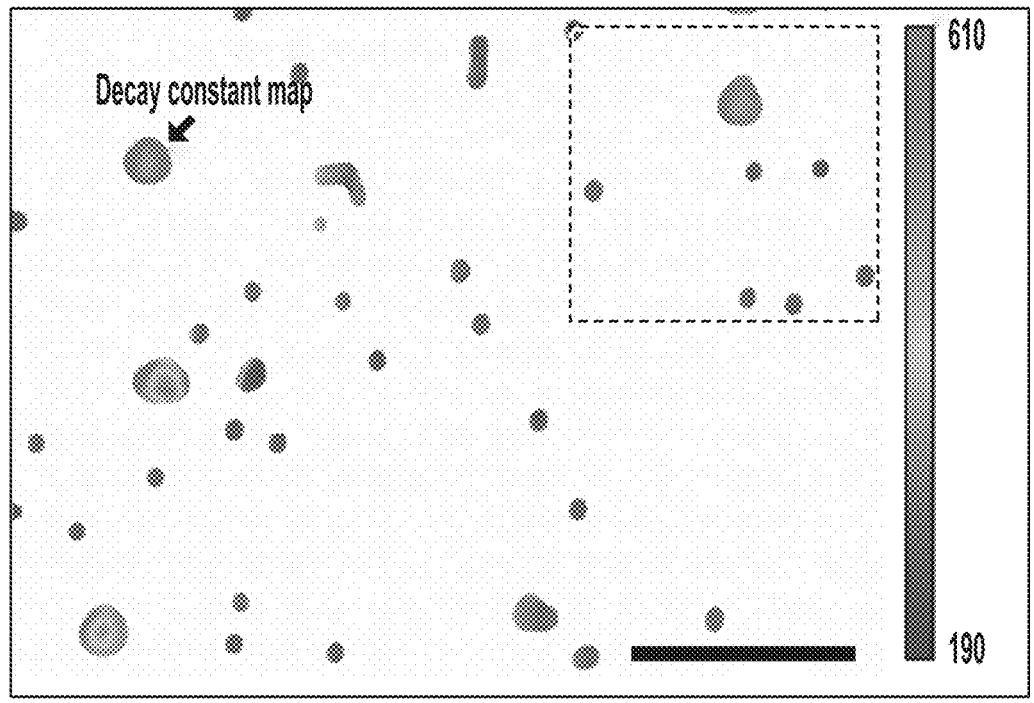
FIG. 7D is a decay constant map produced by the PDI system, in accordance with some embodiments.
Figure 7E:
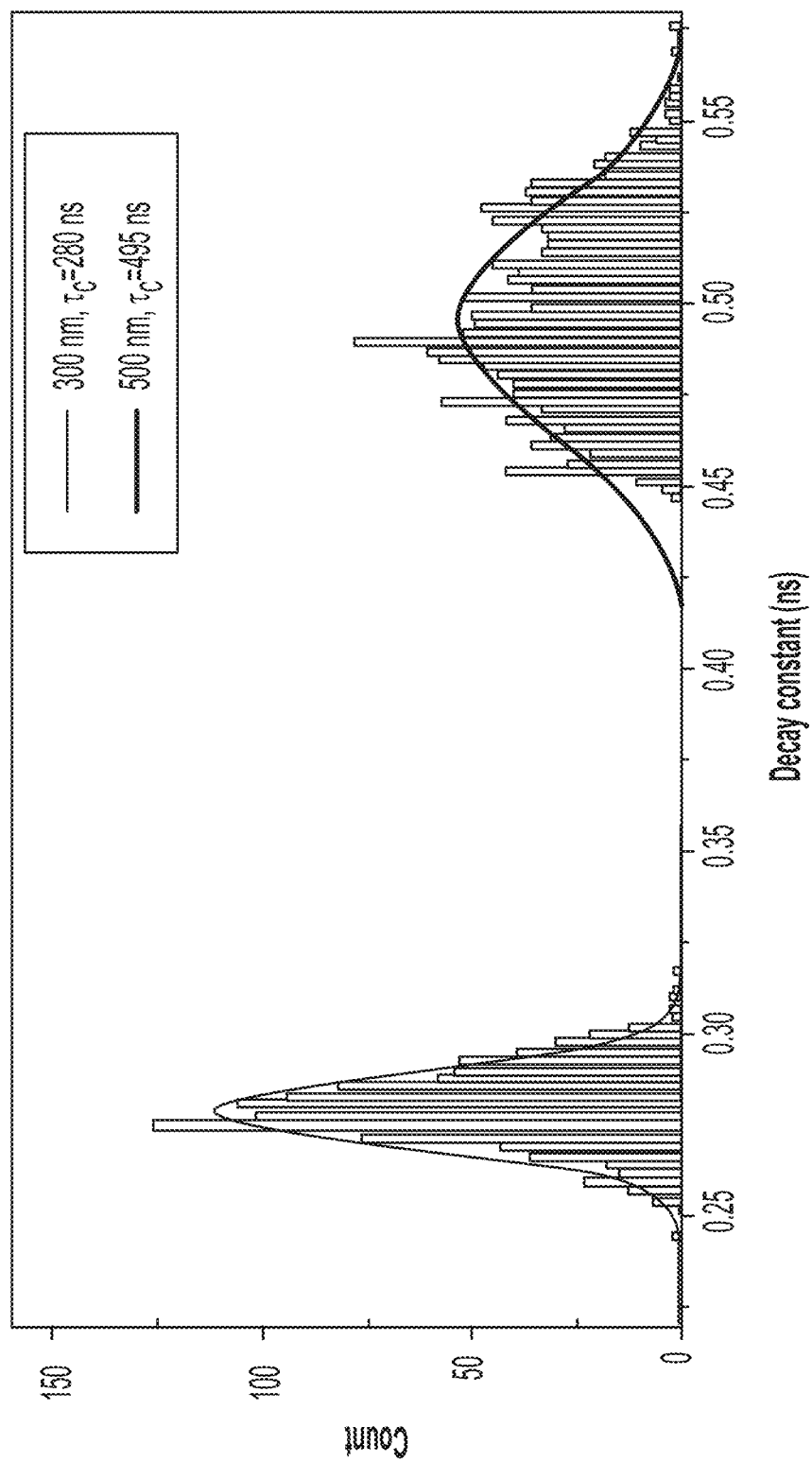
FIG. 7E is a histogram of the decay constant map of the selected area in FIG. 7D, in accordance with some embodiments.

The decay signal at each pixel is fitted, and a decay constant map is generated, indicating the thermal lifetime to perform statistical analysis, as shown in FIG. 7D. The histogram of the selected area in the decay constant map is shown in FIG. 7E, where one observes two peaks representing the 300 nm PMMA particles and the 500 nm PMMA particles with center values of 280 ns and 495 ns, respectively. From this result, the decay constant is scaled 1.8 times between the 300 nm and 500 nm PMMA particles. Also, the decay constant may be scaled 2.8 times when estimated with $r^2$ dependency.

The CaF$_2$ substrate has a much larger heat conductivity (9.71 W/(mK)) than air (0.026 W/(mK)). This difference is caused by the influence of variation in the substrate-contact area of different particles. As a result, particles in such a microenvironment would have a heterogeneous heat dissipation capability with varying sizes of surface area attachment. As the size increases, the surface contact area of the substrate becomes larger, increasing the heat transfer capability of large particles. Indeed, from the decay constant map, one can observe the heterogeneous thermal properties of the 500 nm PMAA particles in FIG. 7D. The center region has a faster decay than the edge, where the surface contact area is small.

A bond-selective PDI of U87 cancer cells in deuterium oxide ($D_2O$) phosphate buffered saline (PBS) was performed to investigate the transient thermal response of various organelles inside the cell. By tuning the IR to 1650 $cm^{-1}$ corresponding to the Amide I band, protein-rich contents inside the cells strongly contrast the photothermal intensity map shown in FIG. 8A. The $D_2O$ PBS is used to maintain cell morphology and to reduce the considerable water absorption of mid-IR at 1650 $cm^{-1}$.

Figure 8A:
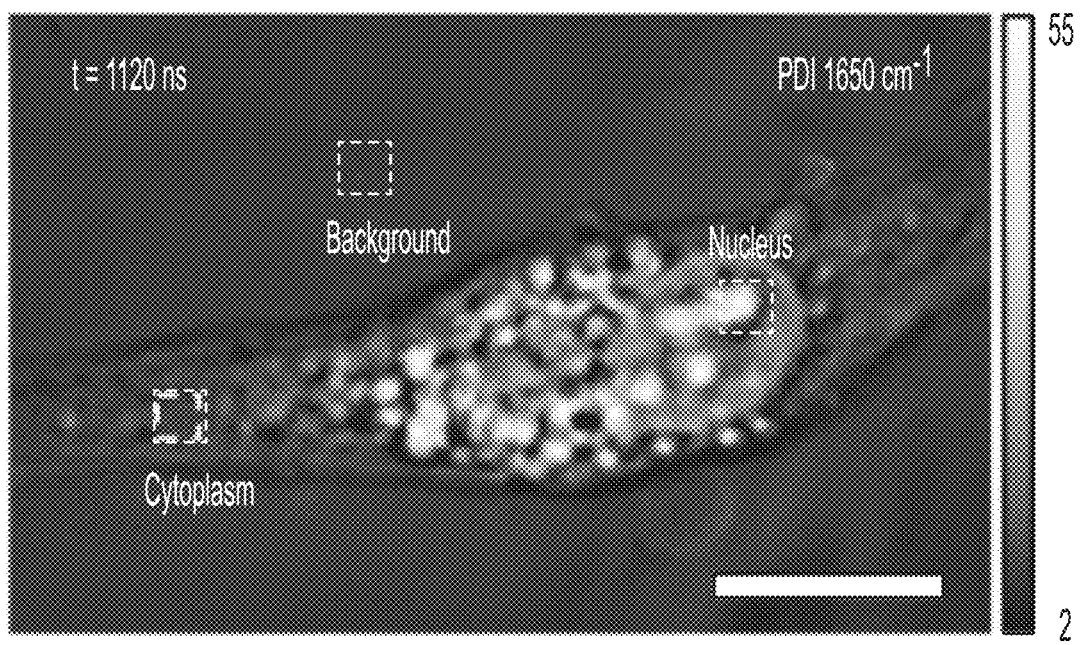
FIG. 8A is a PDI acquired photothermal intensity image of U87 cancer cells at 1650 $cm^{-1}$, in accordance with some embodiments.
Figure 8B:
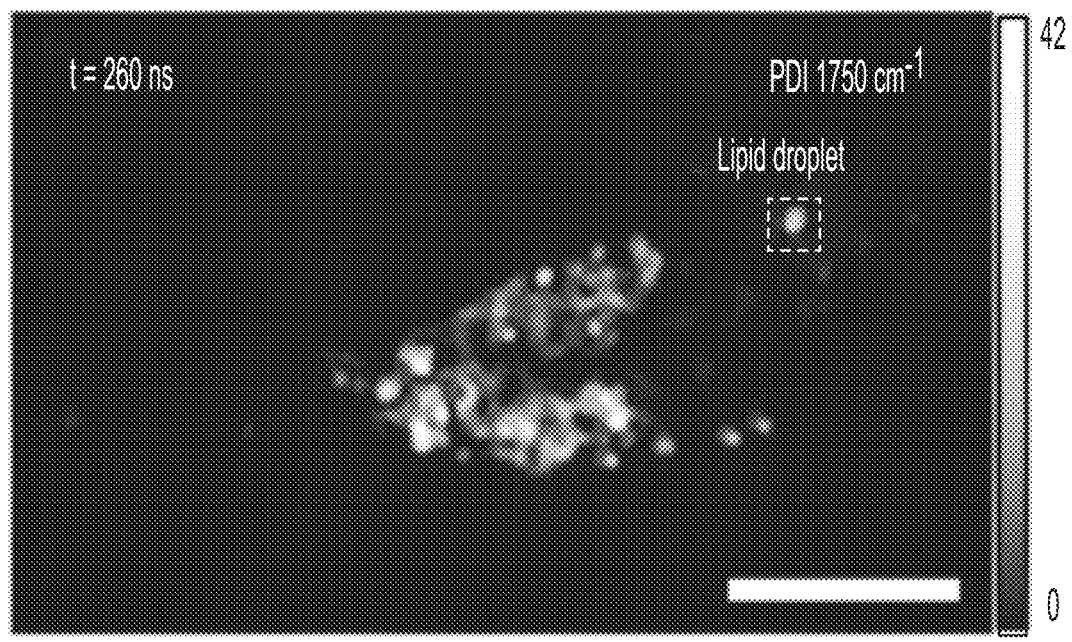
FIG. 8B is a mid-infrared photothermal (MIP) image at 1750 cm−1 of a lipid C=O band, in accordance with some embodiments.

In FIG. 8A, one can observe uniformly distributed protein contents in the cytoplasm and a strong signal from the nucleolus. The background has a photothermal signal but is relatively weak compared to the cells' signal. This is due to the residual water absorption at this wavenumber. By tuning the IR to 1750 $cm^{-1}$ corresponding to the C=O band from lipids, individual lipid droplets showed a strong signal in FIG. 8B.

Figures 8C, 8D:
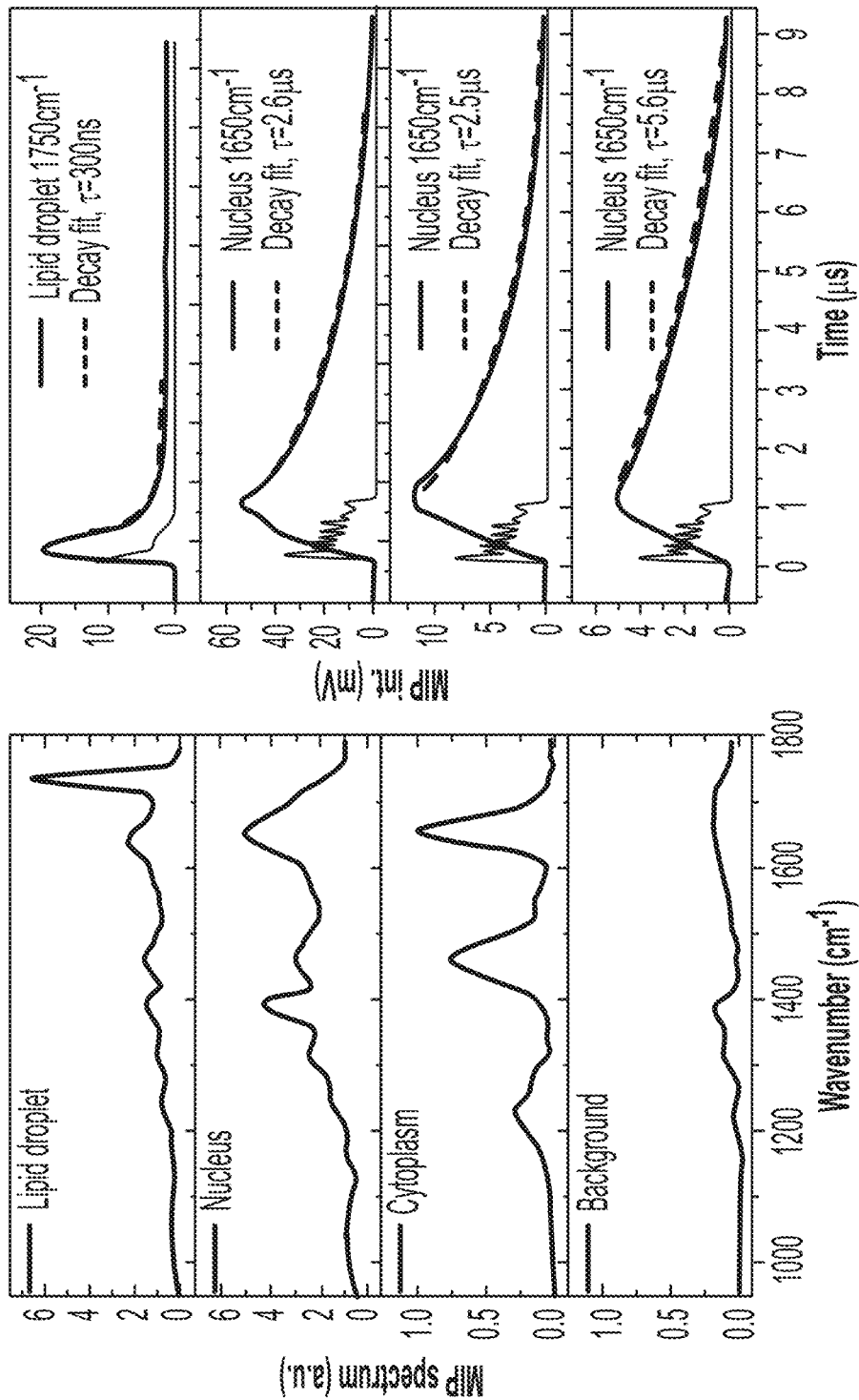
FIG. 8C is a MIP spectra of locations indicated in FIGS. 8A-8B, in accordance with some embodiments.
FIG. 8D are graphs of the thermodynamics of the locations indicated in FIGS. 8A-8B, in accordance with some embodiments.

Photothermal spectroscopy was performed for the lipid droplet, nucleus, cytoplasm, and background medium. The spectra for each content are shown in FIG. 8C. The spectra at the nucleus and cytoplasm showed a strong peak in the Amide I band at 1655 $cm^{-1}$ and shifted Amide II band at 1450 $cm^{-1}$ due to deuterium substitution of N—H bonds. In the spectra of the lipid droplets, a strong peak occurred at 1750 $cm^{-1}$, indicating a high C=O content. FIG. 8D shows the photothermal dynamics of the lipid droplet, nucleus, cytoplasm, and background medium, respectively.

Interestingly, the spectra of the lipid droplets indicated a broad peak centered at 1650 $cm^{-1}$. It matched the result of the intensity map of FIG. 8A at 1650 $cm^{-1}$, where the lipid droplets become bright as well. Lipid's abnormal strong contrast at this protein band is widely observed in other reported scattering-based photothermal systems. One may investigate this signal's origin by studying its transient photothermal signals, enabled by the PDI approach described herein.

Together with the IR chemical specificity, the photothermal dynamics of the various subcellular components are evaluated, as shown in FIG. 8D. The results showed a distinct thermal response between different organelles. Lipid droplets inside cells are similar to isolated particles embedded in an aqueous environment. Therefore, they have a relatively fast decayed signal with a time constant of 300 ns. Nucleolus and cytoplasm with rich protein contents have slower decay signals compared to lipid droplets, which are 2.5 μs.

Interestingly, the background at 1650 $cm^{-1}$ has the longest decay with a decay constant larger than 5 μs due to its large water heat capacity. For a more intuitive illustration, the decay constant map for 1650 $cm^{-1}$ (as shown in FIG. 8E) and 1750 $cm^{-1}$ (as shown in FIG. 8F) was generated. From the decay maps of FIG. 8E and FIG. 8F, one can differentiate the background and cellular structures for their distinct thermal dynamics. A thermal boundary between cell and background medium can be observed at the edge indicated as dash line 802 in FIG. 8E.

Lipid droplets have a decay constant ranging from 150 ns to 500 ns at the 1750 $cm^{-1}$ excitation, as shown in FIG. 8F. However, the higher decay constant of lipids is not revealed under 1650 $cm^{-1}$. Instead, they have a decay constant similar to the background medium. The cytoplasm and nucleus have decay constants at 2.5 μs at the 1650 $cm^{-1}$ excitation.

Detected signals typically originate from scattering field modulation. The scattering intensity is proportional to the $(n_s - n_m)$, where ns and nm are the refractive indexes of the sample and background medium, respectively. This assumes the size influence is neglectable. In MIP modulation with water absorption, both $n_s(t)$ and $n_m(t)$ are time-dependent. Any of them changing can result in a scattering intensity modulation.

The underlying dynamics of lipid droplets are plotted at excitations 1650 $cm^{-1}$ (as shown in FIG. 8G) and 1750 $cm^{-1}$ (as shown in FIG. 8H). Indeed, the revealed dynamics indicate different thermal properties. At 1750 $cm^{-1}$, lipid signals LD1, LD2, and LD3 have fast responses and decay times in the order of a few hundred nanoseconds. However, at 1650 $cm^{-1}$, lipid signals LD1, LD2, and LD3 showed a relatively slower decay with a decay constant higher than 5 μs. This transient response is similar to the water background, as shown in the dash lines 804 in FIG. 8G.

The derivative of the time-resolved photothermal signal was taken to determine whether this crosstalk comes from the heat exchange between the water background medium and the lipids. With such different thermal properties, the 1650 $cm^{-1}$ peak in lipid signals LD1, LD2, and LD3 should come from the water background medium rather than the organelles themselves. No delay longer than 20 nanoseconds is observed at 1650 $cm^{-1}$, indicating a negligible heat diffusion during the heating and signal generation. Therefore, the background medium is the major contributor to the change of nm due to water absorption.

The PDI system differentiated the signal contribution in the temporal domain by utilizing the distinct thermal property between the water background medium and lipid droplets LD1, LD2, and LD3. One can successfully extract the water-induced signals of lipids LD1, LD2, and LD3 via a simple program that evaluates their photothermal intensity and decay constant, as shown in FIG. 8I. After removing the water-induced signals at 1650 $cm^{-1}$ from the intensity image, a well-separated content map is acquired between lipids and proteins, as shown in FIG. 8J.

Figure 9A:
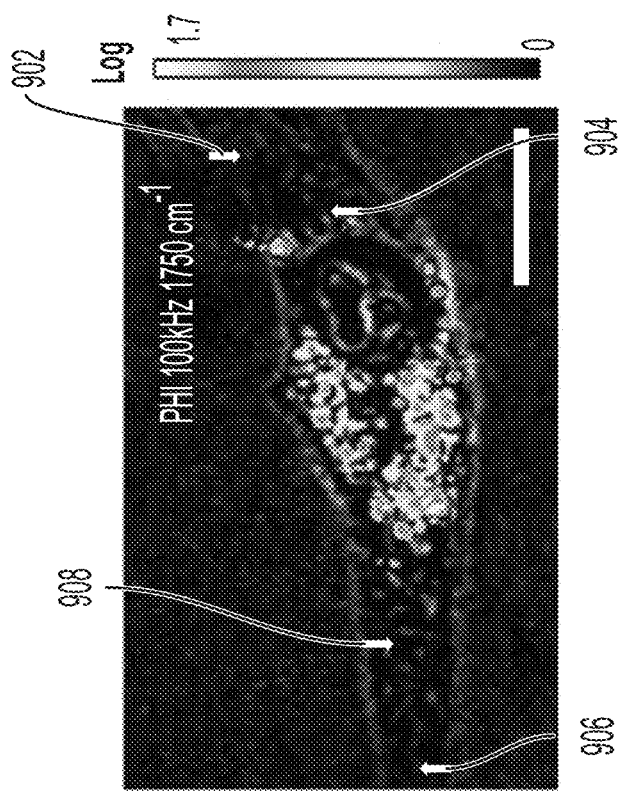
FIG. 9A is a PDI acquired photothermal intensity image of U87 cancer cell at 1750 $cm^{-1}$, in accordance with some embodiments.
Figure 9B:
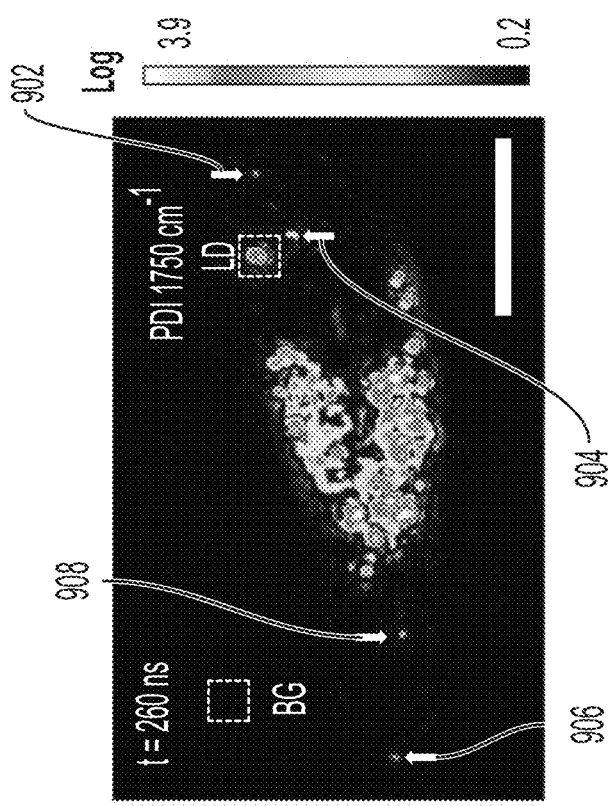
FIG. 9B is a MIP image of the same field of view as FIG. 9A at 1750 $cm^{-1}$ acquired by lock-in with resonant amplifier, in accordance with some embodiments.

The photothermal dynamic results show lipid droplets quickly decay in a few hundreds of nanoseconds. At the same time, the water background is much slower, on the order of a few microseconds. By capturing the high-order harmonic signals, PDI further enabled us to visualize the small lipids 902-908, as shown in FIG. 9A. These small lipids 902-908 were buried entirely in the water background when lock-in detection was used, as shown in FIG. 9B. A Fourier analysis of the photothermal dynamic signals was performed to understand this capability better.

The transient photothermal signals of the background signal (BD) and lipid signal (LD) associated with the lipid 902-908 are shown in FIG. 9C. FIG. 9C shows the fundamental components or first-order harmonics, at 100 kHz, for the background signal (BD) and lipid signal (LD) acquired by Fourier transform and plotted. The background signal (BD) and lipid signal have fast responses and present high-order harmonic components. On the contrary, the water background is localized at the fundamental modulation frequency. Thus, lock-in demodulation at the fundamental frequency minimizes the contrast between lipid droplets and the background.

The frequency responses of the background signal (BD) and lipid signal (LD) are shown in FIG. 9D. The slow background signal has components in the first and second harmonics. As a comparison, the fast lipid signal (LD) is widely spread out in the frequency domain, with the first harmonic only containing less than one-fifth of the total energy. Consequently, the lipid to background ratio (L/D) increases till the 21st harmonic.

Figure 9E:
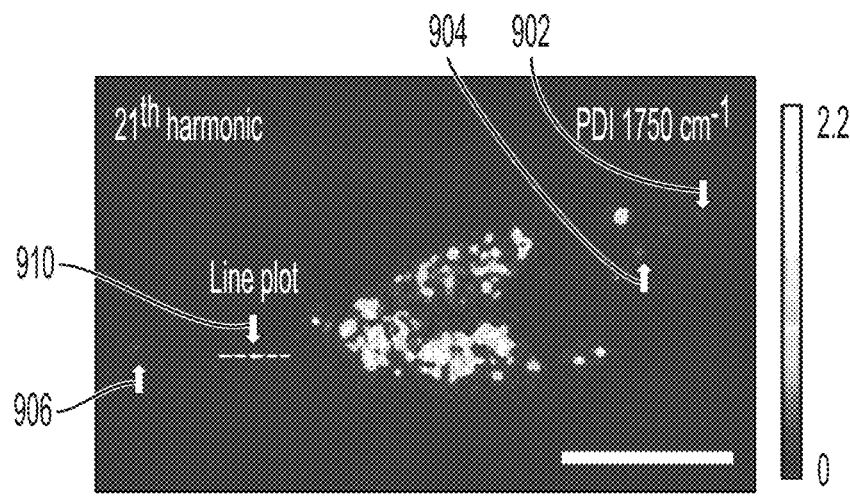
FIG. 9E are transfer functions of the background and the lipid droplets with decay constant of 5 μs and 300 ns, respectively, in accordance with some embodiments.
Figure 9F:
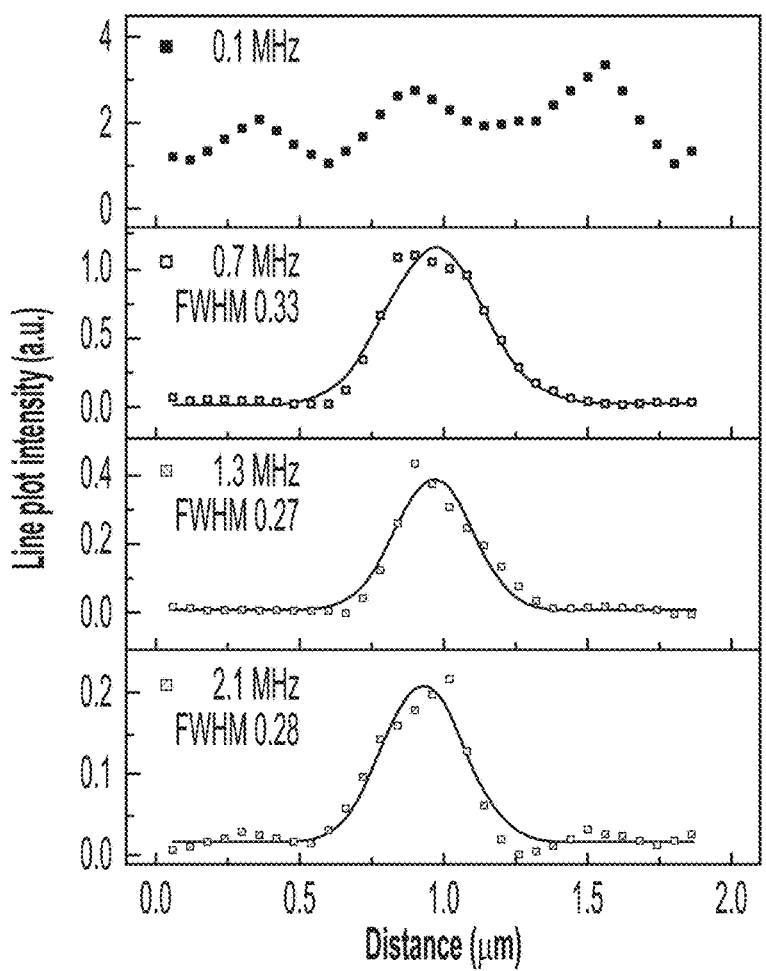
FIG. 9F is an intensity profile of a line indicated in FIG. 9C at different frequencies, in accordance with some embodiments.

At the first harmonic that lock-in demodulation, the contrast is the lowest, as shown in FIG. 9D, and the lipid signal is hardly resolved from the background signal. FIG. 9E shows the photothermal image of the 21st harmonic (2.1 MHz), demonstrating clear contrast for small lipids with minimal background. The intensity profiles of line 910, as shown in FIG. 9E are plotted in FIG. 9F at different frequencies. Lipid signals with a decent lipid-to-background ratio (L/D) are shown in the higher-order harmonics (0.7 MHz to 2.1 MHz).

Figure 10:
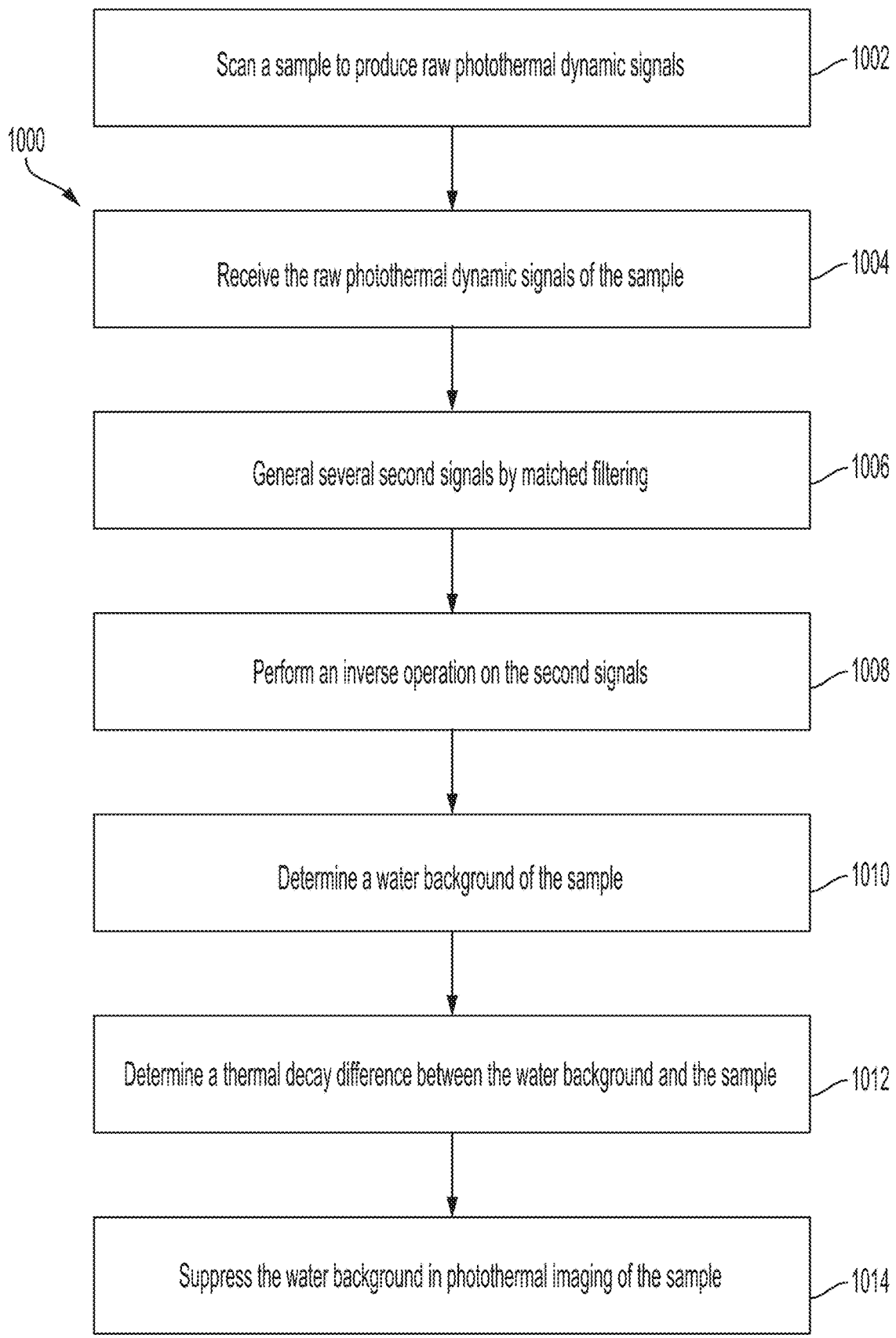
FIG. 10 is a process flowgraph of operations included in an example process for performing photothermal dynamic imaging, in accordance with some embodiments.

FIG. 10 is a process flowgraph of operations included in an example process 1000 for performing photothermal dynamic imaging, in accordance with some embodiments. The operations may be implemented using computer-executable instructions stored on one or more non-transitory machine-readable storage media. The instructions may be executed by one or more processing devices, such as the processor 208, as described in FIG. 2, to implement the operations.

Process 1000 includes scanning a sample to produce a plurality of raw photothermal dynamic signals (Step 1002). Process 1000 includes receiving the raw photothermal dynamic signals of the sample (Step 1004). Process 1000 includes generating a plurality of second signals (such as filtered photo signals) by matched filtering the raw photothermal dynamic signals to reject non-modulated noise. The matched filtering is performed by a comb-like passband (passband 302) in the frequency domain. The comb-like passband includes at least one window (such as window 304) with a center position colocalized at harmonic frequencies to reject non-modulated noise (such as noise 308). Process 1000 includes performing an inverse operation on the second signals to retrieve at least one thermodynamic signal in a temporal domain. Process 1000 includes determining, using the at least one thermodynamic signal, a water background (such as water background in FIGS. 8A-8I) of the sample (Step 310). A thermal decay difference is determined between the water background and the sample (Step 1012). Process includes suppressing, using the thermal decay difference, the water background in photothermal imaging (such as well-separated content map of FIG. 8I) of the sample (Step 1014).

Figure 11:
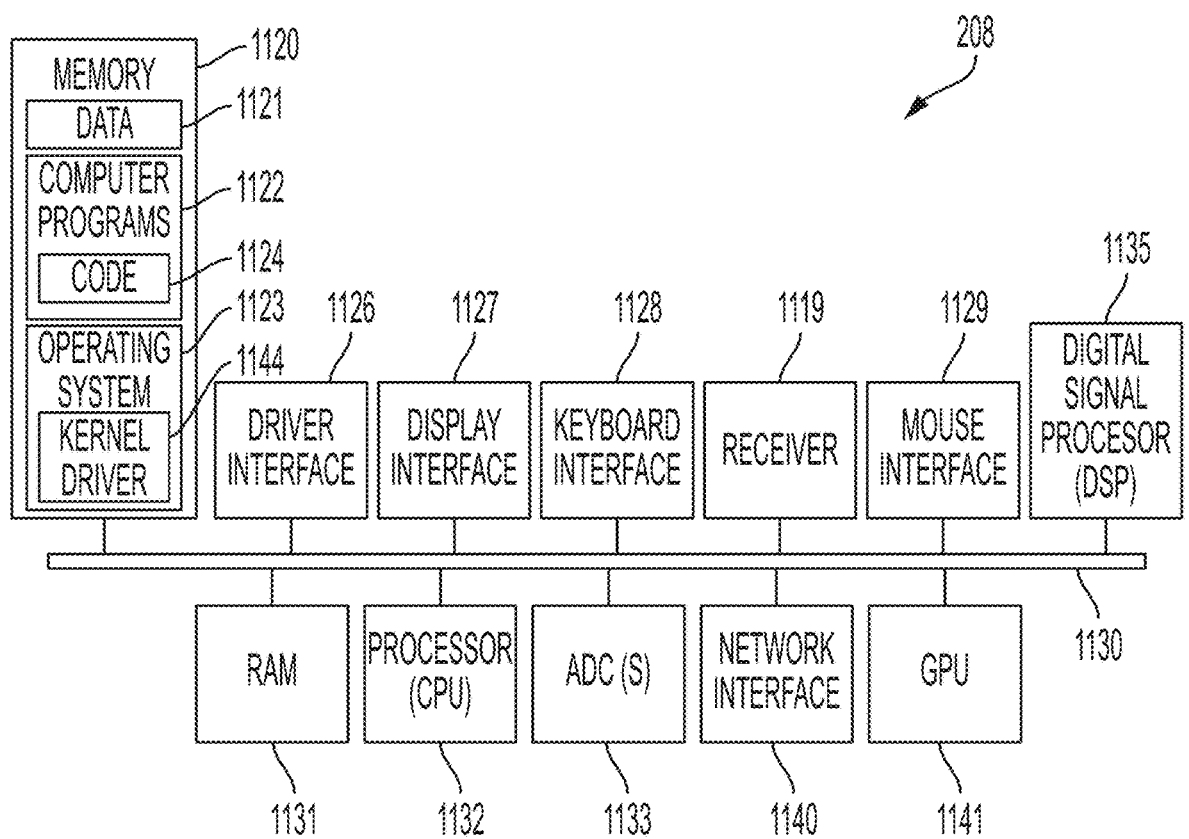
FIG. 11 is a schematic diagram of components that may be included in a computer system shown in FIG. 2A, in accordance with some embodiments.

FIG. 11 is a schematic diagram of components that may be included in a computer system 208, in accordance with some embodiments. As shown in FIG. 11, computer system 208 includes memory 1120, which may include a non-transitory computer-readable medium such as a computer hard disk. Memory 1120 stores data 1121, computer programs 1122, and operating system 1123, among other things. The operating system 1123 includes a driver, for example a kernel driver 1144, for controlling the operations of computer system 208. Among the computer programs stored in memory 1120 is computer code 1124 associated with methods 300 and 1000. Also included in computer system 208 are drive interface 1126, display interface 1127, keyboard interface 1128, mouse interface 1129, one or more computer buses 1130, random access memory (RAM) 1131, processor (CPU) 1132, and graphic processing unit (GPU) 1141. The computer system 208 may include a display that works in conjunction with display interface 1127, and a keyboard that works in conjunction with keyboard interface 1128 for inputting text and user commands. Also, the computer system 208 may include a mouse that works in conjunction with mouse interface 1129 for positioning a cursor on display screen and for inputting user commands.

In some embodiments, memory 1120 may contain multiple memory components for storing data. In some embodiments, RAM 1131 may contain multiple RAMs for processing computer instructions.

Processor 1132 may be a microprocessor, programmable logic, or the like for executing computer programs, such those noted above, out of RAM 1131. Processor 1132 accesses computer programs (or other data) stored on an external device via drive interface 1126. GPU 1141 is a type of processing device. For example, the GPU 1141 may be a programmable logic chip that is configured to implement and to control display functionality. To this end, a GPU 1141 may be programmed to render images, animation, and video on the computer's screen. The GPU 1141 may be located on a plug-in card or in a chipset on the motherboard of the computer system, or the GPU 1141 may be in the same physical chip as the CPU 1132. In some implementations, the CPU 1132 may contain multiple CPUs. The multiple CPUs may be configured for parallel computing, in some embodiments.

The computer system 208 may have a receiver 1119, e.g., a radio receiver, to receive and/or transmit information wirelessly or the like. Computer system 208 may also include one or more analog to digital converters (ADC) 1133 to convert incoming analog RF signals from receiver 1119 to digital samples. The computer system 208 may also include a digital signal processor (DSP) 1135 to perform digital signal processing operations on the digital samples. The DSP 1135 may also be operated to improve the quality of the digital samples. The DSP may also be capable of executing computer programs that do not relate to signal processing.

Computer system 208 includes a network interface 1140, such as an Ethernet port, for interfacing to a network, such as the Internet. In some embodiments, computer system 208 may be a server connected to multiple computer systems 208.

In some implementations, multiple electronic components, such as the GPU 1141, the CPU 1132, and/or the DSP 1135, may execute one or more computer programs concurrently or contemporaneously. In some implementations, the GPU 1141 may contain multiple components of each type shown in FIG. 11; for example, multiple CPUs, multiple GPUs, multiple DSPs, and so forth. One or more of each type of component may be configured to execute one or more computer programs concurrently, contemporaneously, or simultaneously.

The disclosure describes a photothermal dynamic imaging (PDI) system that can sense the transient photothermal modulation with nanosecond temporal resolution. This advanced technology enables concurrent detection of chemically specific IR absorption and physically specific thermal dynamics at submicron spatial resolution. For the first time, one may retrieve the thermal response of various organelles inside a cell. Using the PDI system, the retrieved data shows that cytoplasm, nucleus, and lipid droplets exhibit distinct time-resolved signatures. Based on the time-resolved signatures, the PDI system enabled the differentiation of small signals from water medium contribution.

The PDI system can improve the SNR over one order of magnitude by capturing all the harmonics. Compared with conventional lock-in approaches, the PDI system increases the sensitivity by more than four-fold for low-duty cycle photothermal signals. This improvement leverages the broad detection bandwidth for capturing all the harmonics components induced by the short pulse IR pump. Notably, this approach primarily benefits the mid-IR photothermal microscope with a powerful optical parametric oscillator (OPO) source, which has a pulse duration of few nanoseconds and a fixed repetition rate of tens kilohertz. Such a short-pulsed and high peak power excitation source is highly preferred for generating large modulation depth of small objects on a thermo-conductive substrate or in an aqueous environment, where heat dissipation is relatively rapid. In such a case, the photothermal signal has a duty cycle of less than 1%, and the lock-in amplifier can only capture a tiny portion of modulation.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for performing photothermal dynamic imaging, the method comprising:
   illuminating a sample with a beam of pulsed infrared radiation to induce a transient temperature change in the sample due to absorption of infrared radiation;
   illuminating at least a portion of the infrared illuminated region of the sample with a beam of probe radiation;
   detecting with a photodiode at least a portion of probe beam radiation scattered from the infrared illuminated region of the sample;
   digitizing an intensity of probe beam radiation detected by the photodiode to produce a raw photothermal dynamic signal; and
   processing, using one or more computing device processors, a plurality of raw photothermal dynamic signals to produce a signal indicative of infrared absorption by the sample by generating a plurality of second signals by matched filtering the raw photothermal dynamic signals to reject non-modulated noise.

2. The method of claim 1, wherein the match filtering is performed by a comb-like passband in the frequency domain, wherein the comb-like passband includes at least one window with a center position colocalized at harmonic frequencies to reject non-modulated noise; and
   performing an inverse operation on the second signals to retrieve at least one thermodynamic signal in a temporal domain.

3. The method of claim 1, further comprising the step of obtaining the signal indicative of infrared absorption by the sample at a plurality of positions on the sample to create an image of infrared absorption by the sample.

4. The method of claim 1 further comprising the step of obtaining the signal indicative of infrared absorption by the sample at a plurality of wavelengths of the infrared source to create a signal indicative of an infrared absorption spectrum of the sample.

5. The method of claim 1 further comprising determining, using the at least one thermodynamic signal, a decay constant of the sample.

6. The method of claim 1 further comprising performing differentiation on the at least one thermodynamic signal to determine time-resolved energy flux of the sample.

7. The method of claim 1, wherein the at least one thermodynamic signal comprises a plurality of harmonics in the frequency domain.

8. The method of claim 1, wherein the at least one thermodynamic signal comprises nanosecond scale thermodynamic information.

9. The method of claim 1, wherein scanning the sample comprises subjecting the sample to a single infrared (IR) pulse excitation with a pulse width between 1 ns to 1000 ns and a period between 1 µs to 100 µs.

10. The method of claim 1, wherein generating the plurality of second signals by matched filtering comprises performing a Fourier transform on the raw photothermal dynamic signals.

11. The method of claim 1, wherein determining the water background of the sample comprises subjecting the sample to a single infrared (IR) pulse excitation of $1650\ \text{cm}^{-1}$.

12. A system for performing photothermal dynamic imaging, the system comprising:
    a source of pulsed infrared radiation configured to illuminate a region of a sample to induce a transient temperature rise in the sample due to absorption of infrared radiation by the sample;
    a source of probe radiation configured to illuminate at least a portion of the infrared illuminated region of the sample; at least one detector configured to detect at least a portion of probe radiation scattered from the sample, a digitizing device configured to digitize an intensity of probe beam radiation detected by a photodiode to produce a raw photothermal dynamic signal, and
    one or more computing device processors configured to process a plurality of raw photothermal dynamic signals to extract a signal indicative of infrared absorption by the sample, wherein the one or more computing device processors are configured to generate a plurality of second signals by matched filtering the raw photothermal dynamic signals to reject non-modulated noise.

13. The system of claim 12, wherein the one or more computing device processors are configured to filter the raw photothermal dynamic signals with a comb-like passband in the frequency domain.

14. The system of claim 13, wherein the comb-like passband includes at least one window with a center position colocalized at harmonic frequencies to reject non-modulated noise and to perform an inverse operation on the second signals to retrieve a at least one thermodynamic signal in a temporal domain.

15. The system of claim 12, further comprising a scan stage configured to enable measurements of the signal indicative of infrared absorption by the sample at a plurality of locations on the sample.

16. The system of claim 15, wherein the source of infrared radiation is configured to enable measurements of the signal indicative of infrared absorption by the sample at a plurality of infrared wavelengths.

17. The system of claim 12, wherein the one or more processors execute instructions configured to determine, using the at least one thermodynamic signal, a decay constant of the sample.

18. The system of claim 12, wherein the one or more processors execute instructions configured to perform differentiation on the at least one thermodynamic signal to determine time-resolved energy flux of the sample.

19. The system of claim 12, wherein the one or more processors execute instructions configured to perform match filtering at a fundamental frequency and harmonics of infrared (IR) modulation frequency.

20. The system of claim 12, wherein the at least one thermodynamic signal comprises nanosecond scale thermodynamic information.

21. The system of claim 12, the source of pulsed infrared radiation is configured to subject the sample to a single infrared (IR) pulse excitation.

22. The system of claim 12, wherein the one or more processors execute instructions are configured to perform a Fourier transform on the raw photothermal dynamic signals.

* * * * *